US007499192B2

(12) United States Patent
Okunishi et al.

(10) Patent No.: US 7,499,192 B2
(45) Date of Patent: Mar. 3, 2009

(54) PROCESS CARTRIDGE FOR IMAGE FORMING DEVICE

(75) Inventors: Kazuo Okunishi, Aichi-Ken (JP); Yoshihiko Yoshizaki, Toyokawa (JP); Hideki Hino, Toyokawa (JP); Kentaro Nagatani, Toyokawa (JP); Yoshiaki Takano, Toyohashi (JP); Daisetsu Tohyama, Amagasaki (JP)

(73) Assignee: Minolta Co., Ltd., Osaka (JP)

(*) Notice: Subject to any disclaimer, the term of this patent is extended or adjusted under 35 U.S.C. 154(b) by 622 days.

(21) Appl. No.: 09/925,734

(22) Filed: Aug. 10, 2001

(65) Prior Publication Data

US 2002/0027676 A1 Mar. 7, 2002

(30) Foreign Application Priority Data

Aug. 23, 2000 (JP) ............................ 2000-252316

(51) Int. Cl.
*G06F 15/00* (2006.01)
*G03G 15/00* (2006.01)

(52) U.S. Cl. .................................... 358/1.16; 358/1.14

(58) Field of Classification Search ................. 358/440, 358/468, 1.16, 1.14, 1.1, 1.8, 1.18; 347/86, 347/101, 214; 399/25; 439/946
See application file for complete search history.

(56) References Cited

U.S. PATENT DOCUMENTS 5,701,402 A * 12/1997 Miyamoto et al. ......... 358/1.16
5,930,553 A * 7/1999 Hirst et al. ..................... 399/8
5,995,774 A * 11/1999 Applegate et al. ............. 399/27
6,019,449 A * 2/2000 Bullock et al. ................ 347/14
6,144,812 A * 11/2000 Ueno .......................... 399/12

FOREIGN PATENT DOCUMENTS

JP 10-026912 1/1998
JP 10-198236 7/1998
JP 11-078171 3/1999
JP 2000-019929 1/2000

OTHER PUBLICATIONS

Japanese Office Action mailed on Jul. 15, 2008 directed at counterpart foreign application JP-2000-252316; 5 pages.

* cited by examiner

*Primary Examiner*—Gabriel I Garcia
(74) *Attorney, Agent, or Firm*—Morrison & Foerster LLP

(57) ABSTRACT

A process cartridge having a nonvolatile memory for storing prescribed information corresponding to addresses is detachably attached to a main body of an image forming device. The nonvolatile memory stores first destination information of "shipment destination" data to be used to control the printing operation by a control system of the main body of the image forming device and second destination information of "lot No." data not to be used to control the printing operation by the control system. The nonvolatile memory allows the image forming device to perform an appropriate printing operation without changing a program of the main body of the image forming device even when a new destination is arisen for a reason of production management, marketing etc. after beginning to put the image forming device on the market.

20 Claims, 21 Drawing Sheets

Fig.8

EEPROM MEMORY MAP

| ADDRESS | DATA NAME | INITIAL VALUE | DATA TYPE |
|---|---|---|---|
| 0 | ATTACHMENT DETECTION | A5A5h | READ AND WRITE ENABLE DATA |
| 1 | NEW ARTICLE DETECTION | 0000h | READ AND WRITE ENABLE DATA |
| 2 | SHIPMENT DESTINATION | 0000h | READ-ONLY DATA |
| 3 | OEM CODE | 0000h | READ-ONLY DATA |
| 4 | COLOR CODE | 0001h(C), 0002h(M), 0004h(Y), 0008h(K), | READ-ONLY DATA |
| 5·6·7·8·9 | LOT NO. | 00000000000000000000h | READ-ONLY DATA |
| 10 | NUMBER OF TIMES OF RECYCLING (RESERVED 1) | 0000h | READ-ONLY DATA |
| 11 | NUMBER OF TIMES OF RECYCLING (RESERVED 2) | 0000h | READ-ONLY DATA |
| 12 | NUMBER OF TIMES OF RECYCLING (RESERVED 3) | 0000h | READ-ONLY DATA |
| 13 | NUMBER OF TIMES OF RECYCLING (RESERVED 4) | 0000h | READ-ONLY DATA |
| 14 | NUMBER OF TIMES OF RECYCLING (RESERVED 5) | 0000h | READ-ONLY DATA |
| 15 | (UNDEFINED) | 0080h | — |
| 16 | (UNDEFINED) | 0080h | — |
| 17 | (UNDEFINED) | 0080h | — |
| 18 | (UNDEFINED) | 0080h | — |
| 19 | (UNDEFINED) | 0080h | — |
| 20 | (UNDEFINED) | 0080h | — |
| 21 | TC HISTORY | 00000000h | READ AND WRITE ENABLE DATA |
| 22 | ATDC SENSOR OFFSET VALUE | 00000000h | READ AND WRITE ENABLE DATA |
| 23 · 24 | DEVELOPING ROLLER COUNTER | 0000h | READ AND WRITE ENABLE DATA |
| 25 · 26 | PHOTORECEPTOR COUNTER | 0000h | READ AND WRITE ENABLE DATA |
| 27~39 | (UNDEFINED) | — | — |
| 40 | ATTACHMENT DETECTION | A5A5h | READ AND WRITE ENABLE DATA |
| 41 | NEW ARTICLE DETECTION | 0000h | READ AND WRITE ENABLE DATA |
| 42~47 | (UNDEFINED) | — | — |
| 48 · 49 | DEVELOPING ROLLER COUNTER | 00000000h | READ AND WRITE ENABLE DATA |
| 50 · 51 | PHOTORECEPTOR COUNTER | 00000000h | READ AND WRITE ENABLE DATA |
| 52 | (UNDEFINED) | — | — |
| 53~58 | (UNDEFINED) | — | — |
| 59 · 60 | DEVELOPING ROLLER COUNTER | 00000000h | READ AND WRITE ENABLE DATA |
| 61 · 62 | PHOTORECEPTOR COUNTER | 00000000h | READ AND WRITE ENABLE DATA |

| SHIPMENT DESTINATION | DESTINATION FOR PRODUCTION MANAGEMENT | CONTENTS OF DESTINATION |
|---|---|---|
| 1 | 123 | JAPANESE MARKET/STANDARD PACK |
| 1 | 124 | JAPANESE MARKET/VALUE PACK |
| 2 | 233 | SOUTHEAST ASIAN MARKET/STANDARD PACK |
| 2 | 234 | SOUTHEAST ASIAN MARKET/VALUE PACK |
| 3 | 345 | NORTH AMERICAN MARKET/STANDARD PACK |
| 3 | 346 | NORTH AMERICAN MARKET/VALUE PACK |
| 1 | 125 | JAPANESE MARKET/RECYCLED PRODUCT |

Fig. 11A

<WHEN ASCII IS USED>

| ADDRESS | CHARACTER STRINGS CONSTITUTING LOT NUMBER | STORED DATA |
| --- | --- | --- |
| 5 (LOWER ORDER) | N | 4Eh |
| 5 (HIGHER ORDER) | A | 41h |
| 6 (LOWER ORDER) | 1 | 31h |
| 6 (HIGHER ORDER) | 2 | 32h |
| 7 (LOWER ORDER) | 3 | 33h |
| 7 (HIGHER ORDER) | 0 | 30h |
| 8 (LOWER ORDER) | 1 | 31h |
| 8 (HIGHER ORDER) | 3 | 33h |
| 9 (LOWER ORDER) | 0 | 30h |
| 9 (HIGHER ORDER) | A | 41h |

Fig. 11B

<WHEN ASCII AND BINARY CODE ARE USED>

| ADDRESS | CHARACTER STRINGS CONSTITUTING LOT NUMBER | STORED DATA |
| --- | --- | --- |
| 5 (LOWER ORDER) | N | 4Eh |
| 5 (HIGHER ORDER) | A | 41h |
| 6 (LOWER ORDER) | 1 2 | 21h |
| 6 (HIGHER ORDER) | 3 0 | 03h |
| 7 (LOWER ORDER) | 1 3 | 31h |
| 7 (HIGHER ORDER) | 0 | F0h |
| 8 (LOWER ORDER) | A | 41h |
| 8 (HIGHER ORDER) | (BLANK AREA) | |
| 9 (LOWER ORDER) | (BLANK AREA) | |
| 9 (HIGHER ORDER) | (BLANK AREA) | |

<DISPLAY UNIT>

<CURSOR CONTROL>

<LOCATION OF LOT NO. DATA>

Fig.20
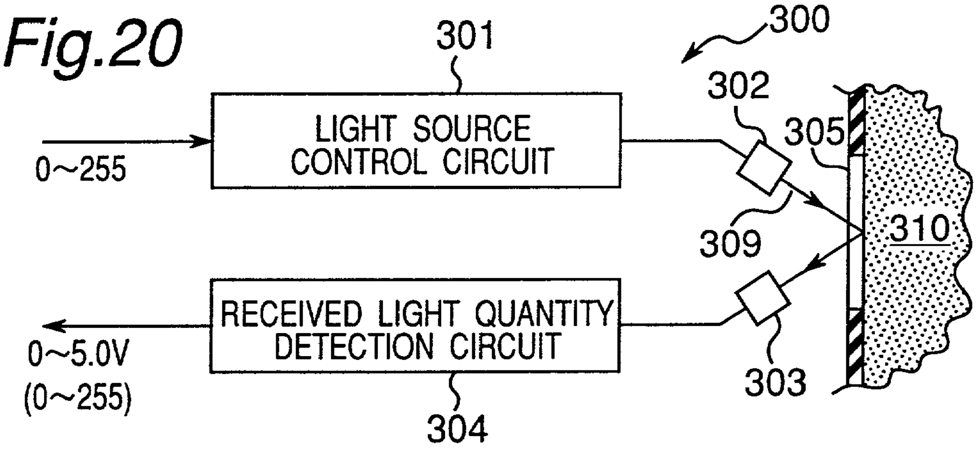
Fig.21
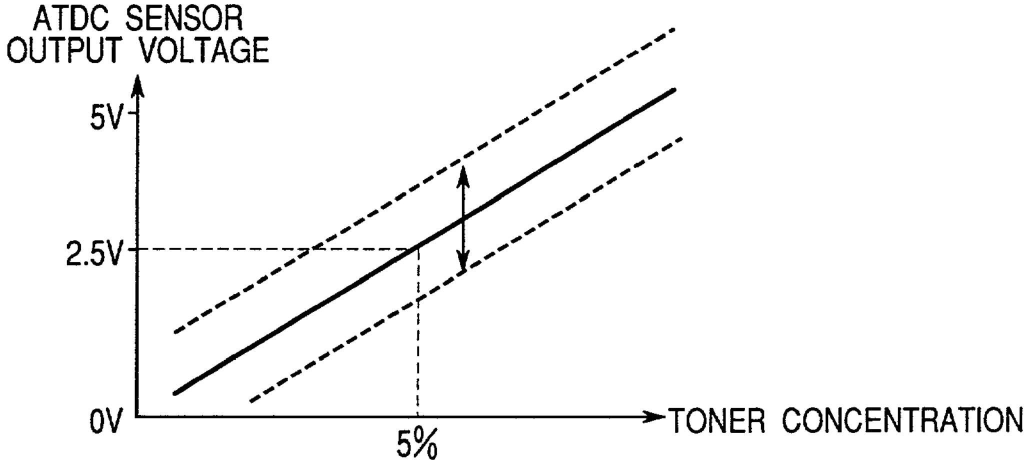
Fig.22
| VALUE STORED AT ADDRESS 15 | 0~9 | 10~19 | ··· | 120~129 | 130~139 | ··· | 250~255 |
|---|---|---|---|---|---|---|---|
| ATDC REFERENCE VALUE ( V ) | 1.2 | ··· | 2.4 | 2.5 | 2.6 | ··· | 3.7 |

PROCESS CARTRIDGE FOR IMAGE FORMING DEVICE

This application is based on application No. 2000-252316 filed in Japan, the entire content of which is hereby incorporated by reference.

BACKGROUND OF THE INVENTION

The present invention relates to a process cartridge which has a component carrying out image formation and a nonvolatile memory storing prescribed information corresponding to addresses and is detachably attached to a main body of an image forming device.

In recent years, primarily for the purpose of recycling of resources, a process cartridge detachably attached to a main body of an image forming device is being widely used. Process cartridges of this kind include the one integrally including a photoreceptor drum, charger, exposing device, developing device, cleaner and toner reservoir required to perform a known electrophotography process as well as a nonvolatile memory storing information about the process cartridge.

Characteristics of the process cartridge of this kind are tuned according to the climate or the like in a shipment destination district. In the nonvolatile memory, destination data indicating the shipment destination district such as the domestic market, the North American market or the like is stored. Consequently, when the process cartridge is attached to the main body of the image forming device, a control system of the main body of the image forming device reads the destination data stored in the nonvolatile memory of the process cartridge before printing operation so as to confirm whether the shipment destination district of the process cartridge matches the shipment destination district of the main body of the image forming device. Therefore, only a process cartridge matching the main body of the image forming device can be used and thus an appropriate printing operation can be performed.

For example, when a “standard pack”, which is a pack containing one process cartridge when shipped, and a “value pack”, which is a pack containing a plurality of process cartridges when shipped, are compared, the process cartridges in the respective packs are the same, but the required number, type and the like of pack material are different. Therefore, these packs need separate destination codes for a reason of production management, particularly, from the viewpoint of payment slip processing. For example, it is assumed that only the “standard pack” is sold in the domestic market for an initial period after release of the product and that destination data stored in the nonvolatile memory of the process cartridge is only “123”, which indicates that the destination is the domestic market. After a while, when the “value pack” is released in the domestic market in response to a demand from the market, separate destination data, for example, “124”, needs to be stored in the nonvolatile memory of the process cartridge even though the shipment destination districts are the same.

However, since only one kind of destination data is stored in a conventional process cartridge, the main body of the image forming device for the domestic market (programmed to use only process cartridges whose destination data is “123”) does not accept those whose destination data is “124” unless a change is made. In order to use a process cartridge of the “value pack”, a program (software) of the main body of the image forming device needs to be changed so that those whose destination data is “124” are accepted. This requires much labor, time and cost.

Furthermore, when a design change or specification change such as improvement or modification of a component (hereinafter, referred to as “design change or the like”) is made after beginning to put the image forming device on the market, process cartridges in a plurality of versions are existent in the market. Depending on the contents of the design change or the like, a failure may occur if a printing operation is performed using a process cartridge in an older version without making any change. For example, due to a design change or the like, there is a case that addresses in the nonvolatile memory which are not used in the initial period after release are used (such unused addresses are usually provided in case for future function enhancement). This case also requires much labor, time and cost since a program of the main body of the image forming device is changed to respond to each design change or the like.

SUMMARY OF THE INVENTION

An object of the invention is to provide a process cartridge which can perform an appropriate printing operation without changing a program of the main body of the image forming device even when a new destination is arisen for a reason of production management, marketing or the like, or even when a design change is made after beginning to put the image forming device on the market.

In order to achieve the above-mentioned object, a first aspect of the present invention provides a process cartridge detachably attached to a main body of an image forming device, the process cartridge comprising:

a component for carrying out image formation; and a nonvolatile memory for storing first destination information to be used to control an printing operation by a control system of the main body of the image forming device and second destination information not to be used to control the printing operation by the control system of the main body of the image forming device.

A second aspect of the present invention provides a process cartridge detachably attached to a main body of an image forming device, the process cartridge comprising:

a component for carrying out image formation; and a nonvolatile memory including an address at which data used by a control system of the main body of the image forming device is stored, a first unused address at which a prescribed value is stored and of which use by the control system of the main body of the image forming device is not defined, and a second unused address at which no data is stored and of which use by the control system of the main body of the image forming device is not defined.

A third aspect of the present invention provides a process cartridge detachably attached to a main body of an image forming device, the process cartridge comprising:

a component for carrying out image formation; and a nonvolatile memory for storing shipment destination data showing a shipment destination district of the process cartridge and for storing a lot number of the process cartridge.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 shows an example of a memory map of the EEPROM;

FIGS. 11A and 11B show how character strings constituting a lot number of the process cartridge are stored as data in the EEPROM;

FIG. 20 shows a constitution of an ATDC sensor;

FIG. 21 shows the relationship between an output voltage and a toner concentration of the ATDC sensor;

FIG. 22 shows an example of a table in which correspondence between a parameter value stored at address 15 in the EEPROM and a reference value of an output voltage of the ATDC sensor is stored;

DETAILED DESCRIPTION OF THE PREFERRED EMBODIMENTS

Embodiments of the present invention are more specifically described below with reference to the accompanying drawings.

Figure 1:
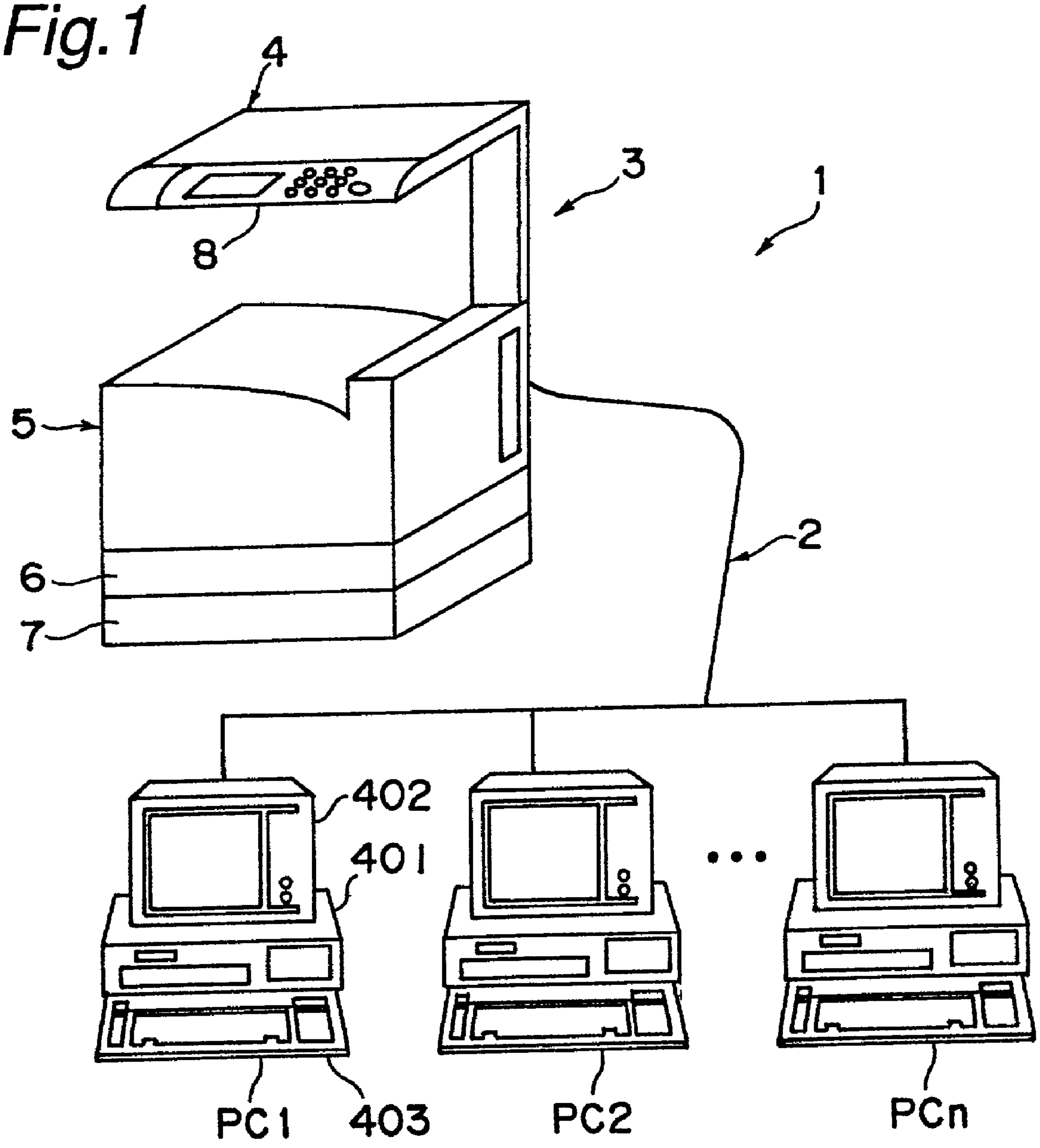
FIG. 1 shows an overall constitution of a printer system including a printer to which a process cartridge is attached according to one embodiment of the present invention.

FIG. 1 shows an overall constitution of a printer system 1 including a printer 3 to which a process cartridge according to one embodiment of the present invention is attached. This printer system 1 is composed of a LAN (Local Area Network) 2, a plurality of terminals PC1-PCn connected thereto and a printer 3.

Each terminal PC1-PCn is composed of a personal computer main body 401 having a hard disc and the like, a monitor display 402 connected to this main body 401, keyboard 403 and so forth. OS (Operating System) matching the network, a printer driver, application software products for making documents and so forth are installed in the hard disc in advance.

When a document or the like made by using an application software product is printed by the printer 3, image data (print data) such as document data or the like and information (paper size information) about paper size to be printed or the like are sent to the printer 3 via the LAN 2.

The printer 3 is composed of a scanner unit 4 for reading a manuscript image and a printer unit 5 for carrying out image formation based on the manuscript image data read by the scanner unit 4 and the print data sent from each terminal PC1-PCn via the LAN 2.

The scanner unit 4 is of a known type, which irradiates a manuscript with light from a light source and photoelectrically converts the reflected light by a CCD image sensor to obtain an electrical signal. The obtained electrical signal is converted to image data by a controller 25 (see FIG. 6) of the printer unit 5.

The printer unit 5 is of a type wherein an image is formed on paper by an electrophotography method. In this example, this printer unit has a paper feed cassette 6 for housing A4-size paper and a paper feed cassette 7 for housing B4-size paper. Each paper feed cassette 6, 7 has a paper detection sensor (not shown) for checking whether the paper runs out. A detection signal from this sensor is sent to the controller 25. The controller 25 judges whether the paper is set in the paper feed cassette 6, 7 based on this detection signal.

Figure 2:
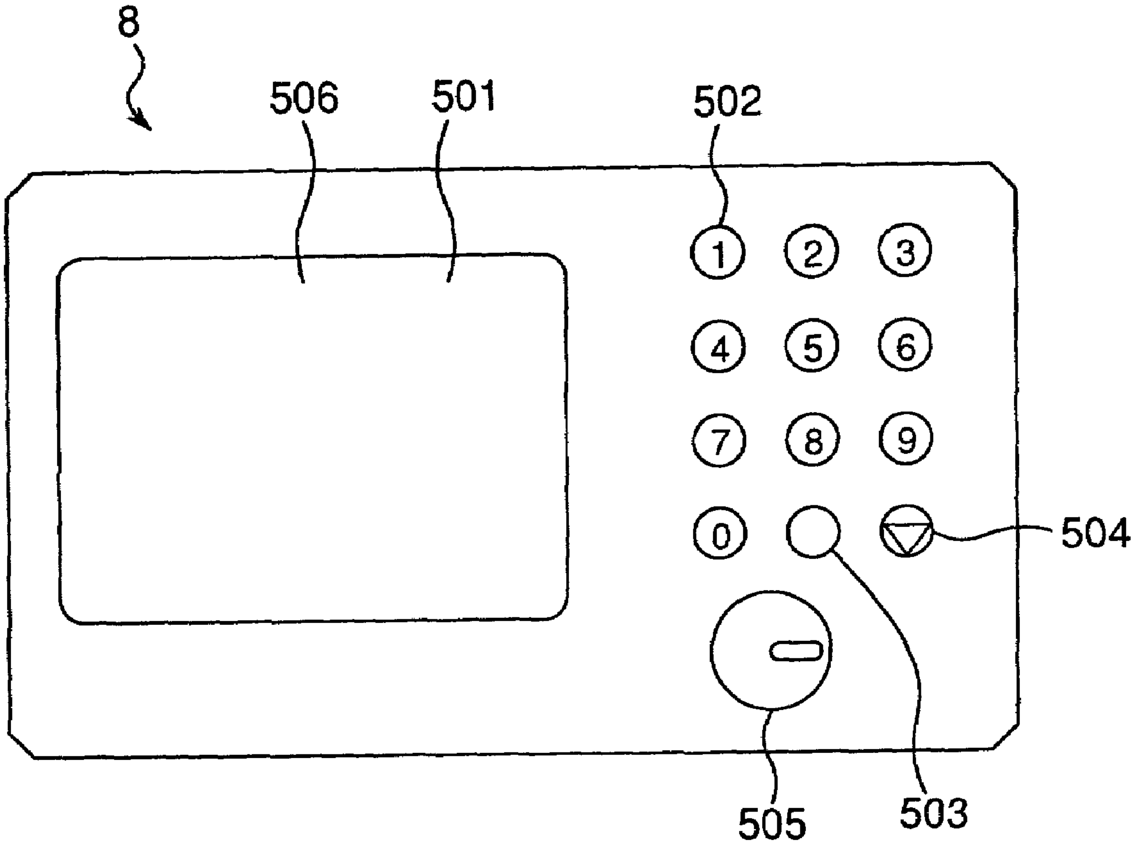
FIG. 2 shows an operation panel of the printer.

An operation panel 8 is provided at a position in front of the scanner unit 4 so as to be easily operated. As shown in FIG. 2, the operation panel 8 has a liquid crystal display device 501 and a touch panel 506, which is provided thereon and composed of a transparent member. The liquid crystal display device 501 displays a printing operation mode of the printer 3 or a state in the printer. The touch panel 506 is composed of pressure-sensitive switches. The user can input commands for prescribed operations such as setting of a printing operation mode by using the touch panel in combination with the liquid crystal display device 501. The operation panel 8 also has a ten key pad 502 for inputting numerical values such as the number of copies of a printed matter, magnification of the printed matter or the like, a start key 505 for instructing a start of a printing operation, a clear key 503 for clearing the printing operation mode set by the user input and a stop key 504 for temporarily stop the printing operation of the printer 3.

Figure 3:
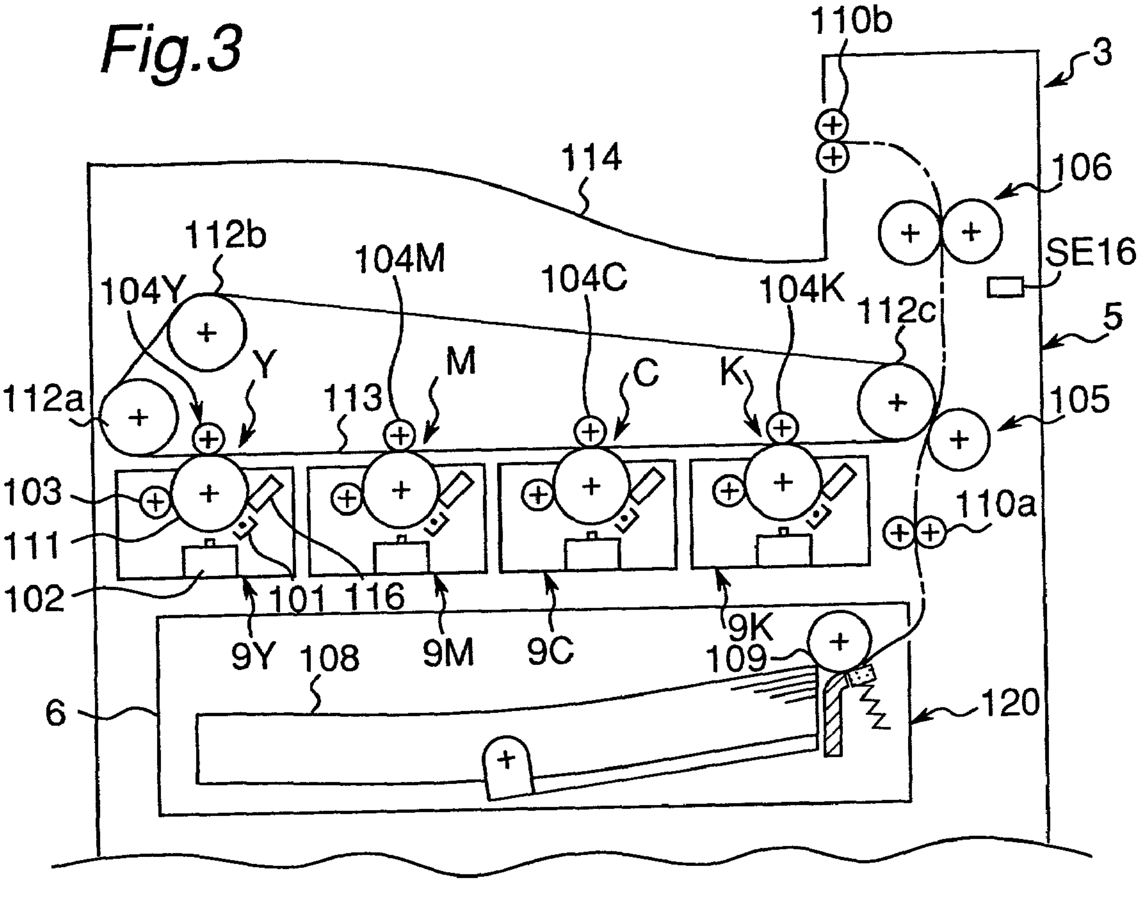
FIG. 3 shows a cross-sectional structure of the printer.

As shown in FIG. 3, the printer 3 has process cartridges 9Y, 9M, 9C, 9K detachably attached to image formation stations Y, M, C, K for yellow, magenta, cyan and black, respectively, at the substantially central portion of the main body of the printer 5. Each process cartridge 9Y, 9M, 9C, 9K has a photoreceptor drum 111 as a component for carrying out image formation, a charger 101 provided around the photoreceptor drum 111, an exposing device 102 having a LED (Light Emitting Diode), a developing device 103 and a cleaner 116 for cleaning a surface of the photoreceptor drum. Furthermore, each process cartridge 9Y, 9M, 9C, 9K has a toner reservoir (not shown) for supplying a corresponding color toner (yellow, magenta, cyan and black) to the incorporated developing device 103. An ATDC (Automatic Toner Density Controller) sensor (described later) used to automatically adjust a toner concentration is integrally attached to the developing device 103 of each process cartridges 9Y, 9M, 9C, 9K. Furthermore, the respective photoreceptor drums 111 of the process cartridge 9Y, 9M, 9C, 9K are opposed to intermediate transfer units 104Y, 104M, 104C, 104K via intermediate a transfer belt 113 supported by rollers 112*a*, 112*b*, 112*c*.

A paper feed/conveying unit 120 is provided in the lower portion of the main body of the printer 5. For example, the paper feed/conveying unit 120 feeds paper 108 housed in the paper feed cassette 6 (the paper feed cassette 7 is omitted to simplify the explanation) one by one by a paper feed roller 109 and conveys the paper to a transfer unit 105 through a conveying roller 110*a*.

In the image formation station for each color, Y, M, C, K, the charger 101 charges the surface of the photoreceptor drum 111 uniformly. Subsequently, the exposing device 102 emits light from a LED (Light Emitting Diode) based on the image data to form a latent image on the photoreceptor drum 111. The developing device 103 attaches a toner supplied from the toner reservoir to the latent image formed on the photoreceptor drum 111 to form a toner image (development). The intermediate transfer unit 104 performs a primary transfer of the toner image formed on the photoreceptor drum 111 onto the intermediate transfer belt 113 driven by the rollers 112*a*, 112*b*, 112*c*. The transfer unit 105 performs a secondary transfer of the toner image on the intermediate transfer belt 113 onto the paper 108 conveyed by the conveying roller 110*a*. The paper 108 onto which the toner image is transferred is conveyed to an image fixation/paper ejection unit 106 provided in the upper portion of the main body of the printer 5.

The image fixation/paper ejection unit 106 fixes the toner image transferred onto the paper 108 and ejects the paper onto which the image is fixed (print) onto a paper ejection tray 114 provided on the upper surface of the main body of the printer 5 via the conveying roller 110*b*.

A front cover (not shown) is provided in front of the main body of the printer 5. Therefore, at least the process cartridge 9 is isolated from the user outside by the front cover. Furthermore, an open or closed state of the front cover can be detected by a sensor SE16.

Figure 4:
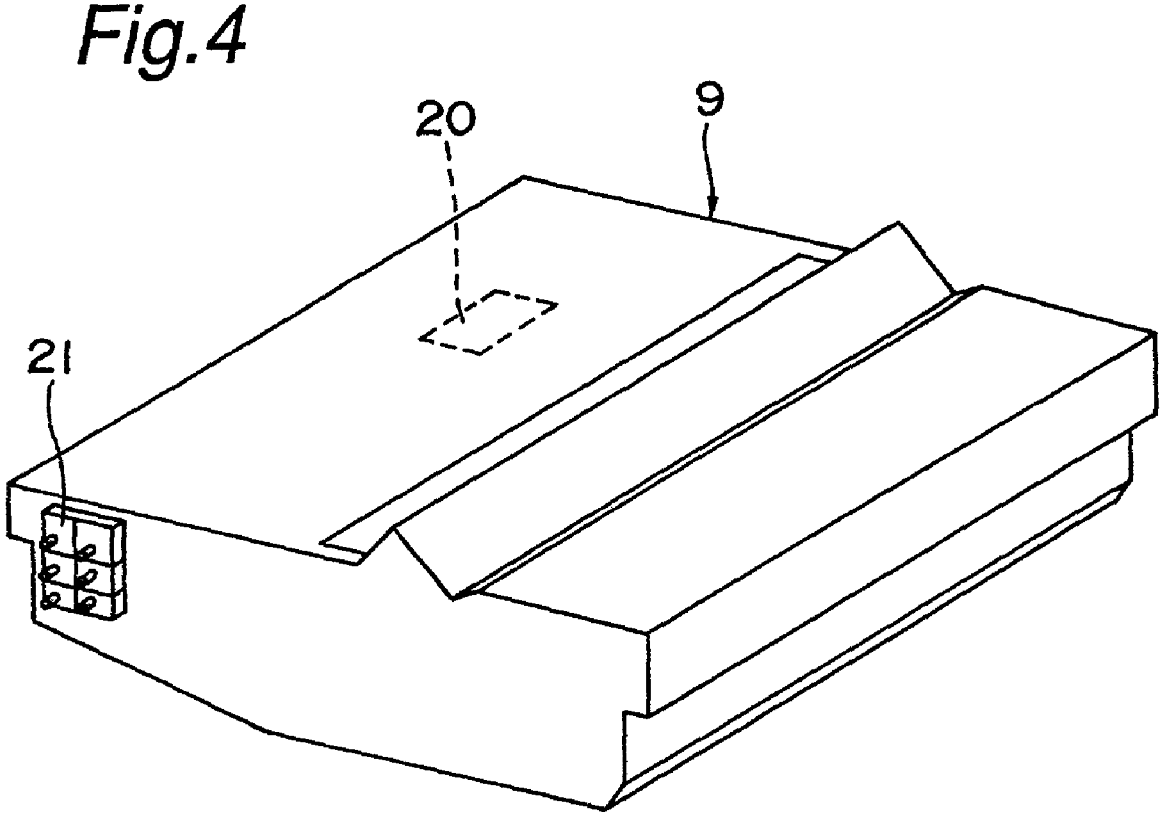
FIG. 4 is a perspective view showing the process cartridge.
Figure 5:
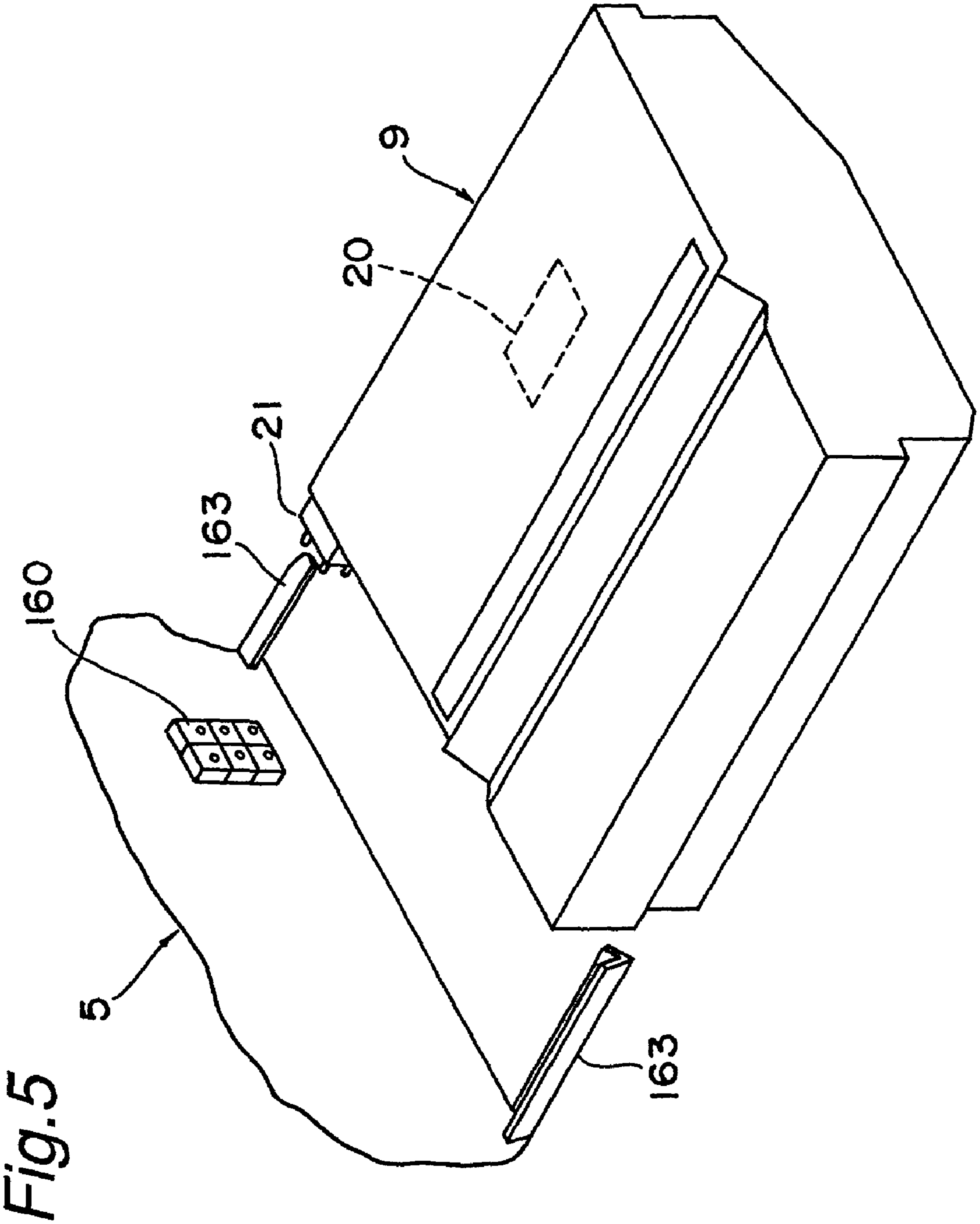
FIG. 5 shows how the process cartridge is attached to a main body of the printer.

FIG. 4 is a perspective view of an appearance of the process cartridge 9 (reference numeral 9 is used to generically refer to 9Y, 9M, 9C and 9K). The process cartridge 9 is obtained by integrally forming as a unit the photoreceptor drum 111, charger 101, exposing device 102, developing device 103 and cleaner 116 shown in FIG. 1. An EEPROM (Electrically Erasable Programmable Read Only Memory) 20 as a non-volatile memory is incorporated in the process cartridge 9. A connector 21 for transferring data is provided on an end surface of the process cartridge 9. When this process cartridge 9 is attached to the main body of the printer 5, as shown in FIG. 5, the process cartridge 9 is inserted into the main body of the printer 5 along a guide member 163 provided in the main body of the printer 5 and the connector 21 of the process cartridge 9 is connected to a connector 160 provided on the side of the main body of the printer 5.

Figure 6:
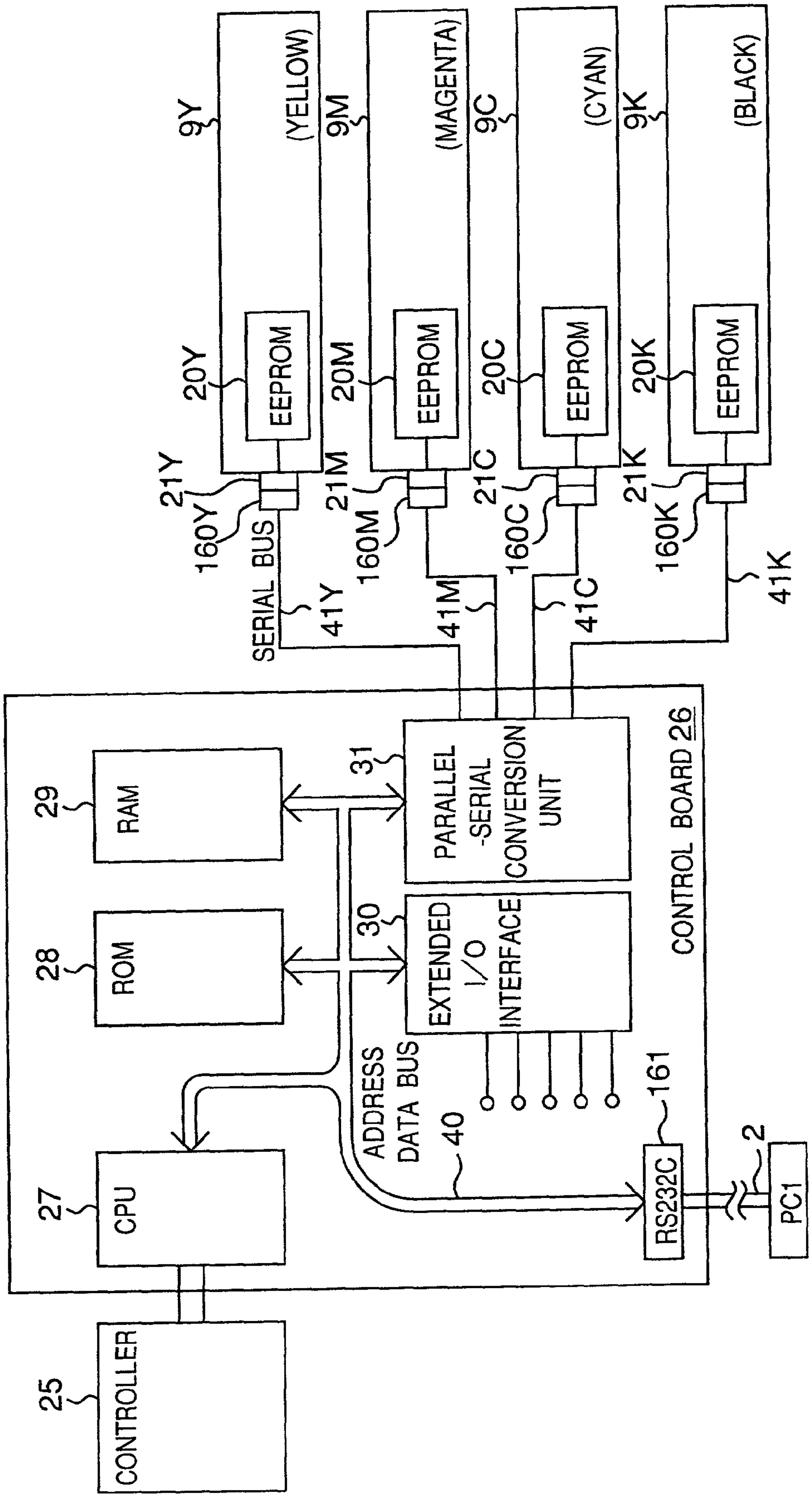
FIG. 6 is a schematic view showing a constitution of a control system of the printer when process cartridges for various colors are attached to the main body of the printer.

FIG. 6 is a schematic view of a constitution of the control system of the printer 3 when the process cartridges of each color 9Y, 9M, 9C, 9K are attached to the main body of the printer 5. Connectors 21Y, 21M, 21C, 21K (corresponding to 21 in FIG. 5) of the process cartridges 9Y, 9M, 9C, 9K are connected to corresponding connectors 160Y, 160M, 160C, 160K, respectively, (corresponding to 160 in FIG. 5) on the side of the main body of the printer 5.

The printer 3 has a controller 25 for controlling operations of whole the printer and a control board 26 for controlling the process cartridges 9Y, 9M, 9C, 9K. A CPU (Central Processing Unit) 27, ROM (Read Only Memory) 28, RAM (Random Access Memory) 29, extended I/O (Input/Output) interface 30 and parallel-serial conversion unit 31 are mounted on the control board 26. These CPU 27, ROM 28, RAM 29, extended I/O interface 30 and parallel-serial conversion unit 31 perform data communication with one another via an address data bus 40. The CPU 27 performs data communication with the controller 25 for printing processing. Also, the parallel-serial conversion unit 31 in the control board 26 performs data communication with EEPROMs 20Y, 20M, 20C, 20K (corresponding to 20 in FIG. 5) in the process cartridges 9Y, 9M, 9C, 9K via the serial buses 41Y, 41M, 41C, 41M, respectively. Furthermore, the control board 26 is connected to the LAN 2 via interface RS232C 161. Consequently, data communication is performed between the control board 26 and a terminal (only PC1 is shown here to facilitate the explanation) via the LAN 2 and various information about the EEPROM 20 can be displayed on the monitor display 402 of the terminal PC1.

Figure 7:
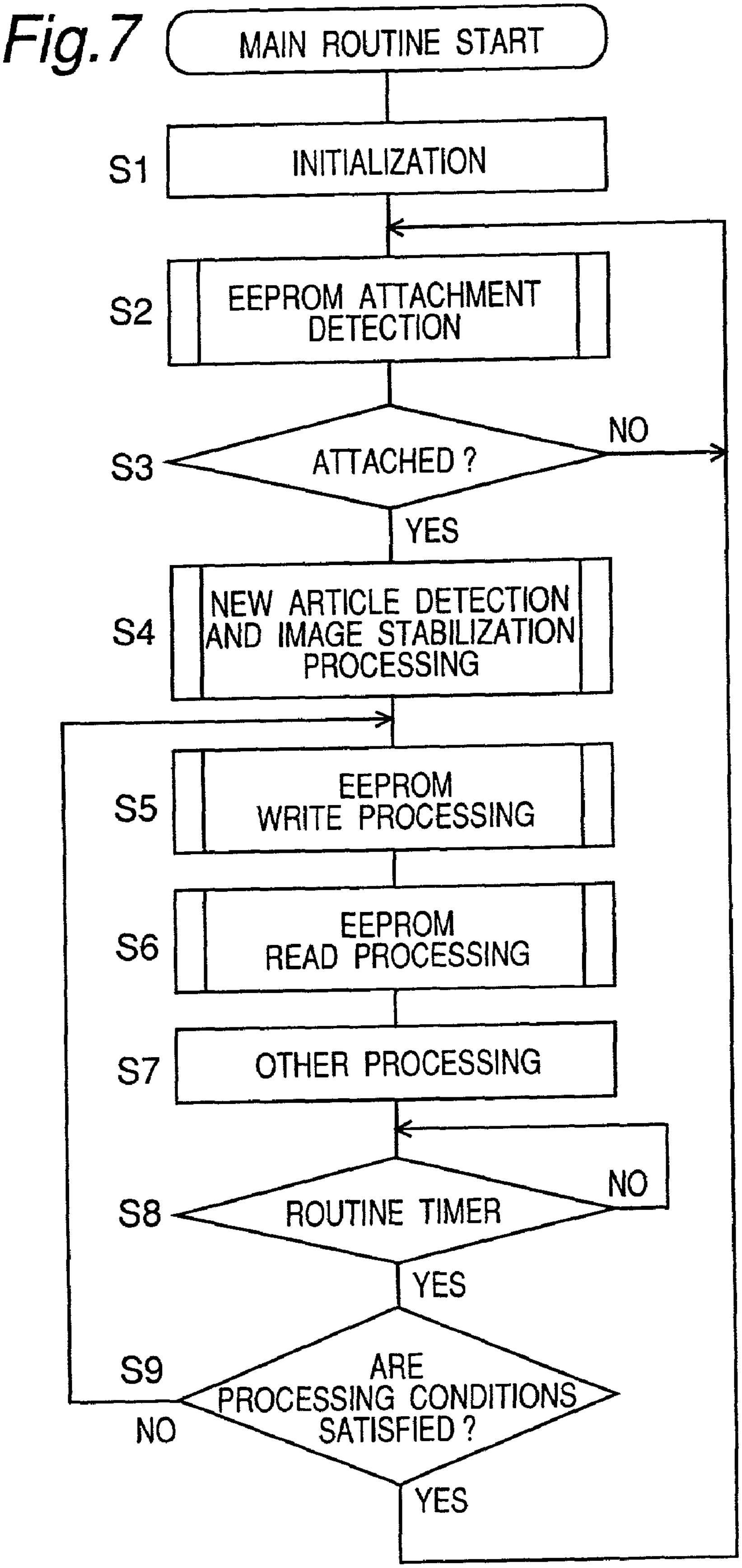
FIG. 7 shows a main routine of controls related to an EEPROM incorporated in a process cartridge.

FIG. 7 shows a main routine of control of each EEPROM 20. When the power is turned on and the CPU 27 on the control board 26 starts operating, prescribed initialization processing is first performed (S1). In the initialization processing, initial setting of the CPU 27, initialization/initial setting of the RAM 29 and the extended I/O interface 30 and the like are performed. Subsequently, attachment detection processing is performed to confirm that the process cartridge 9 is normally connected to the main body of the printer 5 and that the EEPROM 20 is normally mounted on the process cartridge 9 (S2). When all requirements are satisfied, it is determined that "the EEPROM 20 is attached". On the other hand, if any of the requirements is unsatisfied, it is determined that "the EEPROM 20 is unattached" (S3). When it is determined that the EEPROM 20 is unattached, the subsequent control processing of EEPROM 20 is not executed and awaited until attachment is complicated. On the other hand, when it is determined that the EEPROM 20 is attached, new article detection/image stabilization processing is performed to check whether each process cartridge 9 is a new article (new article information) and an image quality related parameter is adjusted (S4). Subsequently, EEPROM write processing (S5) and EEPROM read processing (S6) are performed and other processing (S7) are performed as required. Subsequently, counting-up of a routine timer is awaited (S8) and whether processing conditions after opening/closing of a door or the like are satisfied is judged (S9). When these conditions are satisfied, it is possible that the EEPROM 20 is removed or replaced. Therefore, the processing goes back to step S2 and the processing (S2-S9) after the EEPROM detection processing is repeated. On the other hand, when such processing conditions are not satisfied, the processing goes back to step S5 and the processing (S5-S9) after the EEPROM write processing is repeated since the same EEPROM is still attached.

FIG. 8 shows an example of a memory map of the EEPROM 20 incorporated in each process cartridge 9. The "address" in the table indicates an address at which data is stored assuming two bytes as one word. The "data name" indicates a name of the data to be stored (and stored data). The "initial value" is a stored value upon shipment from a factory. The "data type" indicates whether the stored data is read-only data or read and write enable data.

As shown in this memory map, the stored data is roughly classified into read-only data such as "color code", "lot No." and the like and read and write enable data such as "developing roller counter", "photoreceptor counter" and the like.

The "attachment detection" data indicates whether the process cartridge 9 is attached. The "new article detection" data indicates whether the process cartridge 9 is a new article. The "shipment destination" data indicates a shipment destination of the process cartridge 9. Destinations are divided into districts such as the domestic market, North American market and so forth. In this example, the "shipment destination" data is set to be code value 1 when the shipment destination is Japanese domestic market. Code value 2 is set when the shipment destination is Southeast Asia. Code value 3 is set when the shipment destination is North America. The "OEM code" data indicates a partner company when the process cartridge 9 is manufactured on an OEM basis. The "color code" data indicates the color of an image formed by the process cartridge 9 (yellow, magenta, cyan or black). The "lot No." data indicates the lot number of the process cartridge 9. Each "number of times of recycling" data indicates the reserved number of times of recycling of the process cartridge 9. The "TC history" data indicates a history of the toner/carrier ratio in the developing device 103 of the process cartridge 9. The "ATDC sensor offset value" indicates a control amount of the developing device 103 of the process cartridge 9 by an output of the ATDC sensor. The "developing roller counter" data indicates the number of times the developing device 103 of the process cartridge 9 is used. The "photoreceptor counter" data indicates the number of times the photoreceptor drum 111 of the process cartridge 9 is used.

Read-only data is never stored at a plurality of locations, but only in one location in the memory map. On the other hand, read and write enable data which has the same contents is stored at a plurality of locations separate from each other in the memory map depending on the number of accesses or importance. When data is stored at consecutive addresses, it is assumed that data is stored at one location even though data is stored over a plurality of addresses. Specifically, data is stored according to the following rules.

(a) When data is accessed many times and is highly important, data having the same contents is stored at three locations separate from each other. For example, a value of the "developing roller counter" is stored at three locations, that is, addresses 23/24, 48/49 and 59/60. Similarly, a value of the "photoreceptor counter" is stored at three locations, that is, addresses 25/26, 50/51 and 61/62.

(b) When data is accessed a moderate number of times and is moderately important, data having the same contents is stored at two locations separate from each other. For example, the result of "attachment detection" is stored at two locations, that is, addresses 0 and 40. Similarly, the result of the "new article detection" is stored at two locations, that is, addresses 1 and 41.

(c) Data which is accessed a small number of times and is not so important is stored at one location. For example, the "lot No." data is stored only at addresses 5-9. The "TC history" is stored only in address 21. Similarly, "ATDC sensor offset value" is stored only in address 22.

According to these rules (a) to (c), data is efficiently located in the EEPROM 20 depending on the error occurrence rate and importance. As a result, the EEPROM 20 has a favorable data location.

(d) When data having the same contents are stored at a plurality of locations separate from each other, data having the same number of locations have the same address shift counts. For example, the "developing roller counter" data and "photoreceptor counter" data are stored at three locations. The address shift count from the first address (address 23/24, address 25/26) to the second address (address 48/49, address 50/51) is 25. The address shift count from the second address (address 48/49, address 50/51) to the third address (address 59/60, address 61/62) is 11. Thus, the address shift counts of both data are the same. Similarly, the "attachment detection" data and "new article detection" data are stored in two locations. The address shift count from the first address (address 0, address 1) to the second address (address 40, address 41) is 40, which is the same address shift count.

(e) On the other hand, when data are stored at the different number of locations, the address shift counts are different from each other. In the above example, the address shift counts of the "developing roller counter" data and "photoreceptor counter" data, which are stored at three locations, are 25 and 11 and different from the address shift count 40 of the "attachment detection" data and "new article detection" data, which are stored at two locations.

(f) Data stored in one location, that is, read-only data such as the "shipment destination" and "OEM code" and the "TC history" data and the "ATDC sensor offset value" data out of the read and write enable data are stored at lower addresses than the second stored addresses of data having the same contents, which are stored at a plurality of addresses. For example, the "shipment destination" data is stored at address 2. The "OEM code" data is stored at address 3. The "TC history" data is stored at address 21. The "ATDC sensor offset value" data is stored at address 22. These addresses 2, 3, . . . , 22 are lower than the lowest second address of data having the same contents, which are stored at a plurality of addresses, that is the second address of the "attachment detection" data 40.

(g) The number of addresses between data having the same contents, which are stored at a plurality of addresses, is larger than the number of addresses occupied by data stored at a different number of addresses between the data. Naturally, this is for locating data stored at a different number of addresses between the data having the same contents, which are stored at a plurality of addresses.

Figure 12:
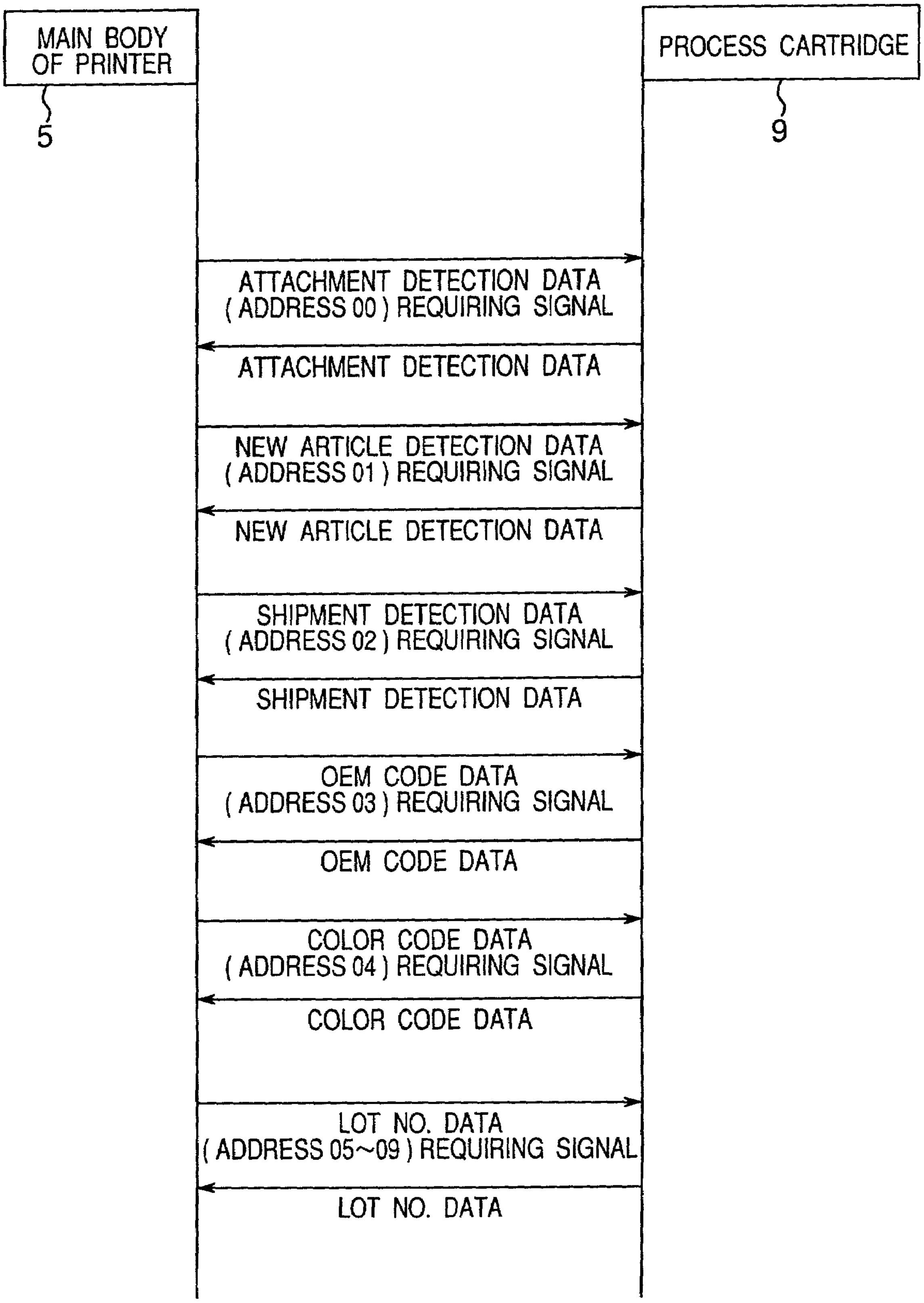
FIG. 12 shows an example of how data communication is performed between the main body of the printer and the process cartridge.

According to the rules (d) to (g), an access program for saving/reading data becomes easy. In particular, according to rule (f), when data is accessed sequentially from a first address as shown in FIG. 12, all the data can be read before the second address storing the data is accessed without repeatedly accessing the same data stored in the EEPROM 20. Therefore, control of access to the EEPROM 20 can be simplified.

Figures 9, 10:
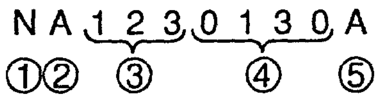
FIG. 9 shows an example of a format of a lot number of the process cartridge.
FIG. 10 shows an example of correspondence between shipment destinations of the process cartridge, destinations for production management and destination contents.

In this embodiment, a lot number (not in a form stored as data, but character strings actually displayed on the product or the display screen) has a format of two alphabetic characters, seven numerical characters and one alphabetic character in this order as shown in FIG. 9. The lot number of the process cartridge 9Y in yellow (Y) is "NA1230130A".

(1) The first alphabetic character ("N" in the above example) is a code indicating a factory which produces the process cartridge. However, a "new article" and "recycled product" have separate codes even when they are produced in the same factory. Also, when one factory has a plurality of production lines and products are produced on different production lines, these products have separate codes.

(2) The next one alphabetic character ("A" in the above example) is a code indicating a model of the process cartridge for each color. In a production stage, a color code is managed by this one alphabetic character.

(3) The first three numerical characters out of the seven numerical characters ("123" in the above example) are codes indicating a destination for production management such as sales district, sales form, whether the product is a new article or recycled product or the like. When the sales form is different, for example, a "standard pack" for shipping one process cartridge in one pack and a "value pack" for shipping a plurality of process cartridges in one pack contain the same process cartridges inside the pack, but the required number, types and the like of pack material are different. Therefore, separate destination codes are given from the viewpoint of production management. Separate destination codes are also given to a "new article" produced by using only new components and a "recycled product" produced by using recycled components from the viewpoint of production management, particularly, payment slip processing since prices upon shipment are different (recycled products are less expensive).

In this example, as shown in FIG. 10, when the process cartridge is for the Japanese domestic market (the "shipment destination" data is 1), this "destination for production management" code is indicated by code value 123 for a "standard pack", code value 124 for a "value pack" and code value 125 for a "recycled product". When the process cartridge is for the Southeast Asian market (the "shipment destination" data is 2), the "standard pack" is indicated by code value 233 and the "value pack" is indicated by code value 234. When the process cartridge is for the North American market ("shipment destination" data is 3), the "standard pack" is indicated by code value 345 and the "value pack" is indicated by code value 346.

(4) The fourth to seventh numerical characters out of the seven numerical characters indicate the date of production of the process cartridge. That is, the fourth numerical character ("0" in the above example) indicates the production year of the process cartridge by the last digit of the year. The fifth numerical character ("1" in the above example) indicates a production month of the process cartridge. January to September are indicated as 1-9, respectively. October, November and December are indicated as X, Y and Z, respectively. The sixth and seventh numerical characters ("30" in the above example) indicate a production date of the process cartridge. The first to thirty first day of the month are indicated as 01-31 as they are.

(5) The last one alphabetic character ("A" in the above example) is a code indicating a version of the process cartridge. The reason for providing this "version" code is that, if a design change (improvement design or VE (value engineering) design) is made to a component of the process cartridge, it is preferable to confirm the version of the process cartridge 9 when the process cartridge 9 is attached to the main body of the printer 5 before a printing operation so that a printing operation is appropriately performed.

Thus, the EEPROM 20 stores "shipment destination" data, which is used when the CPU 27 and controller 25 of the main body of the printer 5 control the printing operation, and the "destination code" (included in the lot number) data, which is not used when the CPU 27 and controller 25 of the main body of the printer 5 control the printing operation.

Therefore, since the lot number of the process cartridge has the above-stated format, even if any trouble occurs in the market, a serviceperson or the like checks the contents displayed on the display and can easily find the destination of the process cartridge set for a reason of production management, marketing or the like.

Furthermore, even when a new destination is arisen for a reason such as production management or marketing after beginning to put the printer on the market, the new destination can be indicated by changing the contents of the "destination code" in the lot number. The contents of the "shipment destination" data do not need to be changed. As a result, when the process cartridge 9 is attached to the main body of the printer 5, the CPU 27 of the main body of the printer 5 reads the "shipment destination" data stored in the EEPROM 20 of the process cartridge before a printing operation so that whether the shipment destination district of the process cartridge 9 matches the shipment destination district of the main body of the printer 5 can be confirmed. Therefore, only the process cartridge 9 matching the main body of the printer 5 can be used without changing a program of the main body of the printer 5. Thus, an appropriate printing operation can be performed.

Figure 14:
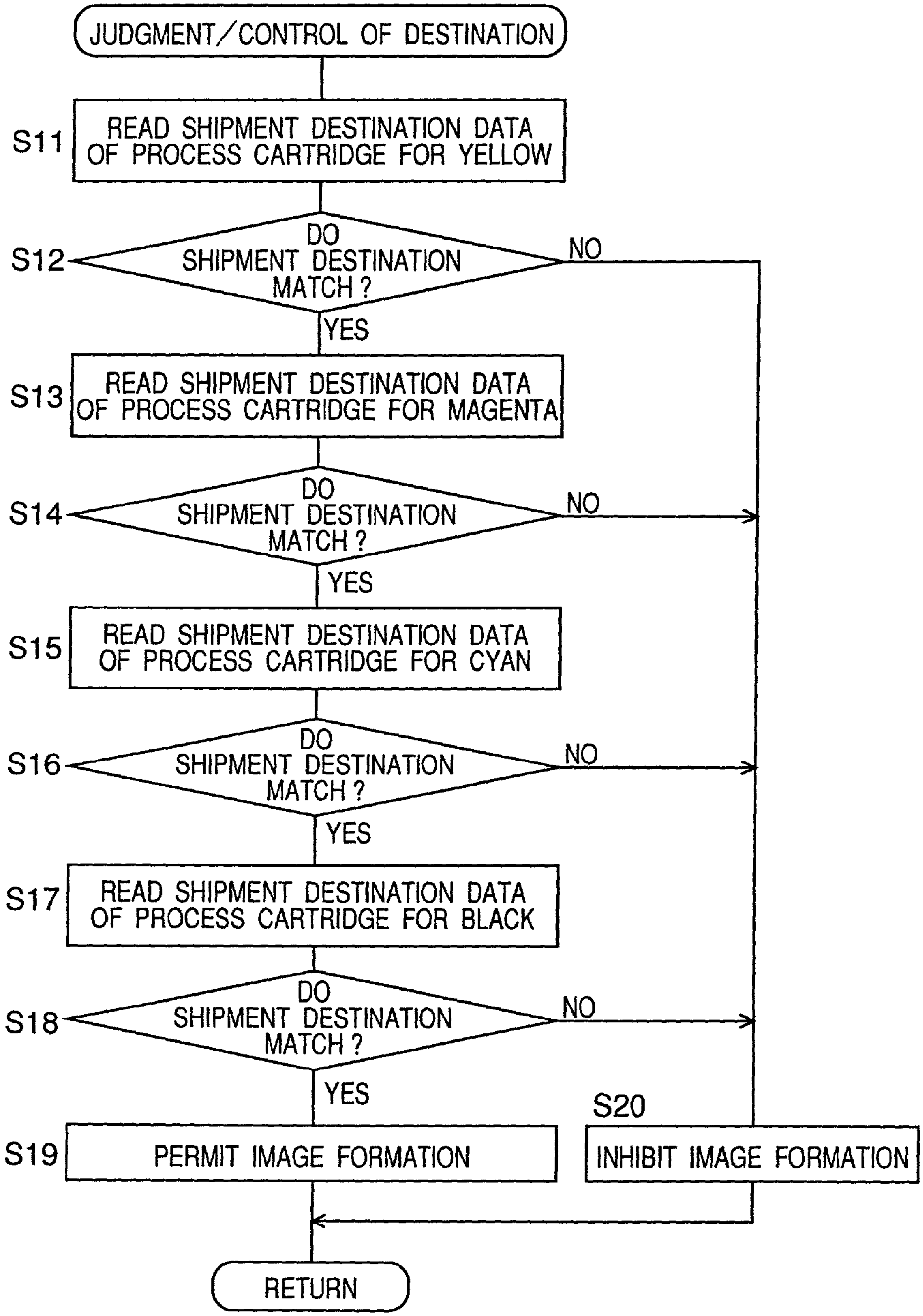
FIG. 14 shows a flow of destination judging/controlling processing for permitting or inhibiting image formation based on the "shipment destination" data stored in the EEPROM.

Specifically, as shown in FIG. 14, the "shipment destination" data is read from the EEPROM 20 of the process cartridge 9Y for yellow (Y) (S11). Then, whether the shipment destination district of the process cartridge 9Y matches the shipment destination district of the main body of the printer 5 is judged (S12). When the shipment destination district of the process cartridge 9Y matches the shipment destination district of the main body of the printer 5, the "shipment destination" data is read from the EEPROM 20 of the process cartridge 9M for magenta (M) (S13) to judge whether the shipment destination district of the process cartridge 9M matches the shipment destination district of the main body of the printer 5 (S14). When the shipment destination district of the process cartridge 9M matches the shipment destination district of the main body of the printer 5, the "shipment destination" data is read from the EEPROM 20 of the process cartridge 9C for cyan (C) (S15) to judge whether the shipment destination district of the process cartridge 9C matches the shipment destination district of the main body of the printer 5 (S16). When the shipment destination district of the process cartridge 9C matches the shipment destination district of the main body of the printer 5, the "shipment destination" data is read from the EEPROM 20 of the process cartridge 9K for black (K) (S17) to judge whether the shipment destination district of the process cartridge 9K matches the shipment destination district of the main body of the printer 5 (S18). When the shipment destination district of the process cartridge 9K matches the shipment destination district of the main body of the printer 5, all the process cartridges 9Y, 9M, 9C, 9K match the main body of the printer 5. Therefore, only at this stage, control for permitting image formation is performed (S19). On the other hand, if a shipment destination district of any of process cartridges 9Y, 9M, 9C, 9K does not match the shipment destination district of the main body of the printer 5, control for inhibiting image formation is performed (S20).

The "destination code" data is stored at addresses 5-9, at which a lot number is stored as part of the "lot No." data of this process cartridge 9. Therefore, the CPU 27 of the main body of the printer 5 can read the "destination code" data by reading the "lot No." data stored at the addresses 5-9. Therefore, a destination of the process cartridge 9 set for a reason of production management, marketing or the like, in this example, whether the product is a "standard pack" or "value pack" and a "new article" or "recycled product" can be informed.

FIGS. 11A and 11B show how character strings constituting a lot number are stored in the EEPROM 20 as "lot No." data.

In an example in FIG. 11A, character strings constituting a lot number ("NA1230130A" in this example) are stored in the EEPROM 20 in ASCII (American Standard Code for Information Interchange). Conversion processing can be omitted when the CPU 27 of the main body of the printer 5 reads the "lot No." data and when the controller 25 displays a lot number including the "destination code" data on a liquid crystal display device 501 while the data is stored in such a format.

In an example in FIG. 11B, character strings constituting a lot number ("NA1230130A" in this example) are stored in the EEPROM 20 in a format in which ASCII and hexadecimal notation are used. Specifically, the first two alphabetic characters ("NA" in this example) are stored in ASCII. The subsequent seven numerical characters ("11230130" in this example) are stored in binary codes as they are. Since there are an odd number of numerical characters in this example, "F" is added to fill a blank space (higher order portion of the address 8). The last one alphabetic character is stored in ASCII. Thus, since the lot number including the "destination code" is stored in the EEPROM 20 by using ASCII and hexadecimal notation, a memory capacity required to store lot numbers can be reduced. In this example, data storage of a numerical part which requires seven bytes requires only four bytes, thereby saving three bytes. Since there are 26 alphabetic characters, conversion processing is complicated. However, complication of conversion processing can be reduced to half or less since there are only 10 numerical characters.

Figure 15:
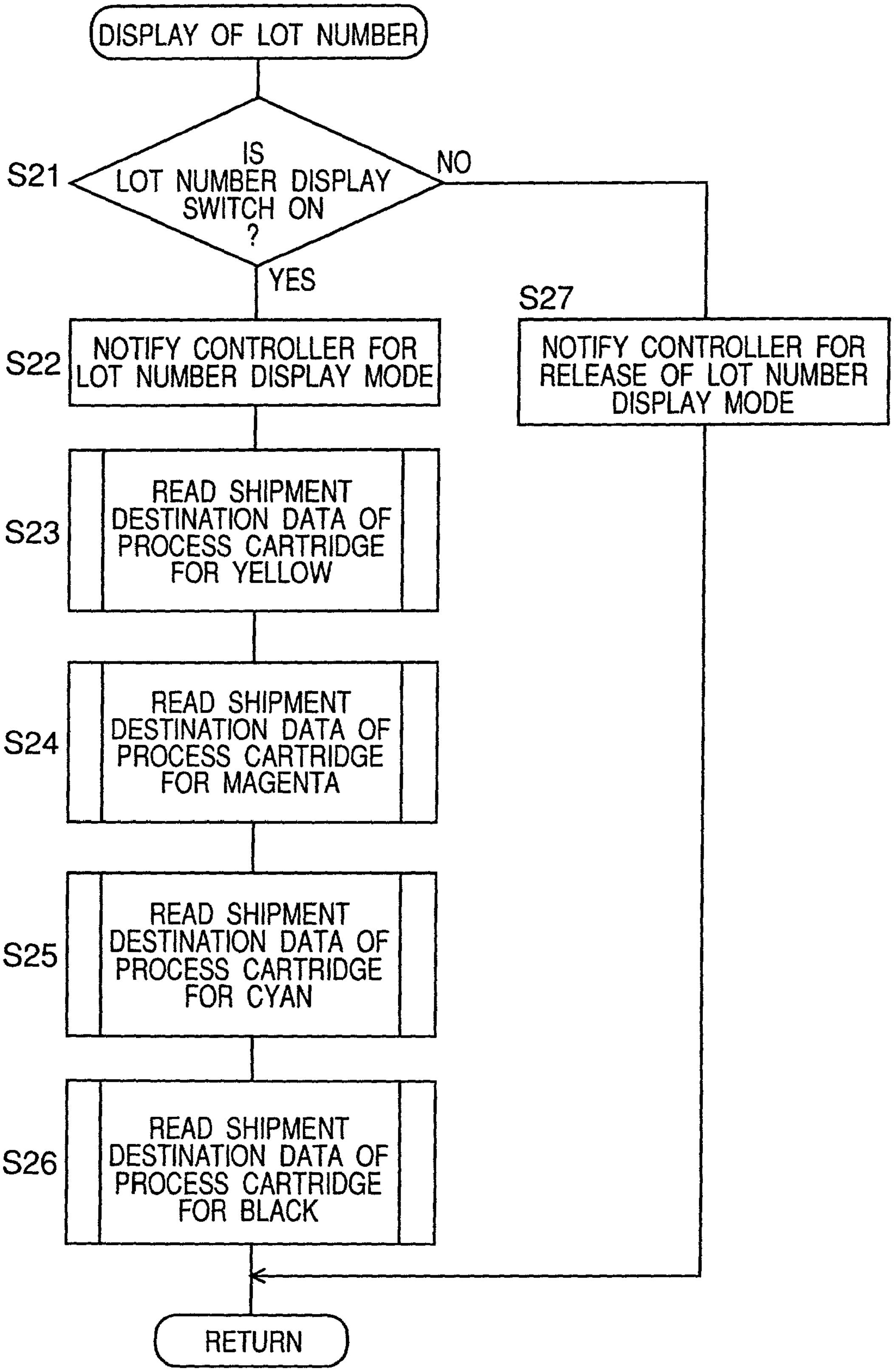
FIG. 15 shows a flow of lot number display processing for displaying a lot number of each process cartridge on a liquid crystal display device.

FIG. 15 shows a flow of how the CPU 27 reads "lot No." data and notifies the controller 25 so as to display the lot number in the liquid crystal display device 501.

First, whether a lot number display switch ("hidden switch" provided to the main body of the printer 5 for a service engineer: not shown) is turned on is judged (S21). When the lot number display switch is on (YES in S21), the CPU 27 notifies the controller 25 that a lot number display mode is to be established (S22). Subsequently, the CPU 27 reads the "lot No." data from the EEPROM 20 of the process cartridge 9Y for yellow (Y) and transfers the data to the controller 25 (S23). Consequently, the lot number of the process cartridge 9Y for yellow (Y) is displayed on the liquid crystal display device 501 by control by the controller 25. Subsequently, the CPU 27 reads the "lot No." data from the EEPROM 20 of the process cartridge 9M for magenta (M) and transfers the data to the controller 25 (S24). Consequently, the lot number of the process cartridge 9M for magenta (M) is displayed on the liquid crystal display device 501 by control by the controller 25. Subsequently, the CPU 27 reads the "lot No." data from the EEPROM 20 of the process cartridge 9C for cyan (C) and transfers the data to the controller 25 (S25). Consequently, the lot number of the process cartridge 9C for cyan (C) is displayed on the liquid crystal display device 501 by control by the controller 25. The "lot No." data is read from the EEPROM 20 of the process cartridge 9K for black (K) and transferred to the controller 25 (S26). Consequently, the lot number of the process cartridge 9K for black (K) is displayed by the liquid crystal display device 501 by control by the controller 25. When these are performed, the service engineer or the like reads the display contents on the liquid crystal display device 501 and a destination of the process cartridge set for a reason of production management, marketing or the like, in this example, a factory, model for each color, sales district/sales form, production date and version can be easily informed. Therefore, for example, the service engineer or the like can promptly take a required measure if any trouble occurs in the market, by reading this display contents.

On the other hand, if the lot number display switch is off (NO in S21), the CPU 27 notifies the controller 25 that the lot number display mode is to be released (S22). Consequently, the controller 25 releases the lot number display mode.

Figure 13:
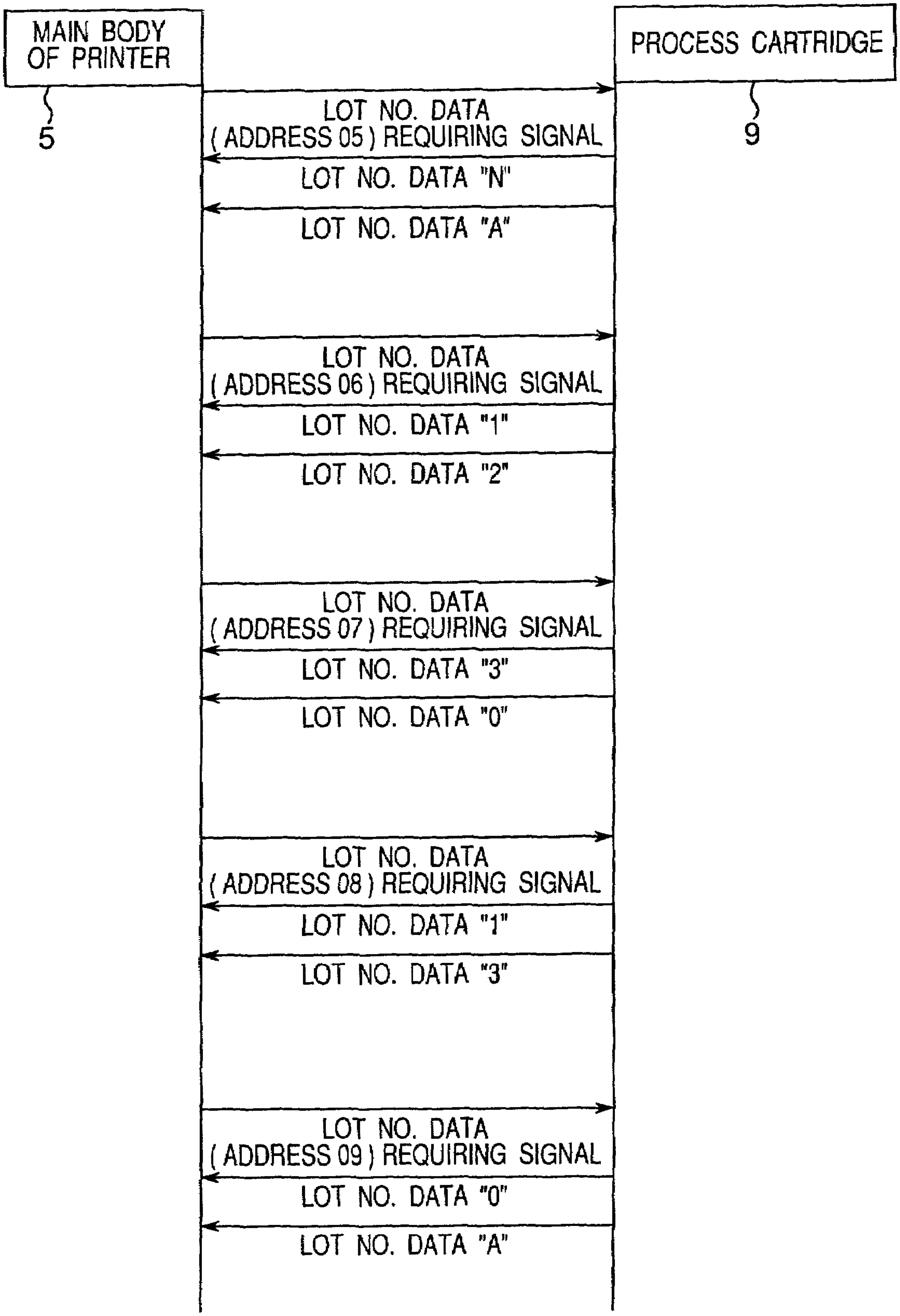
FIG. 13 shows an example of how data communication is performed between the main body of the printer and the process cartridge, particularly, related to lot number data.
Figure 16:
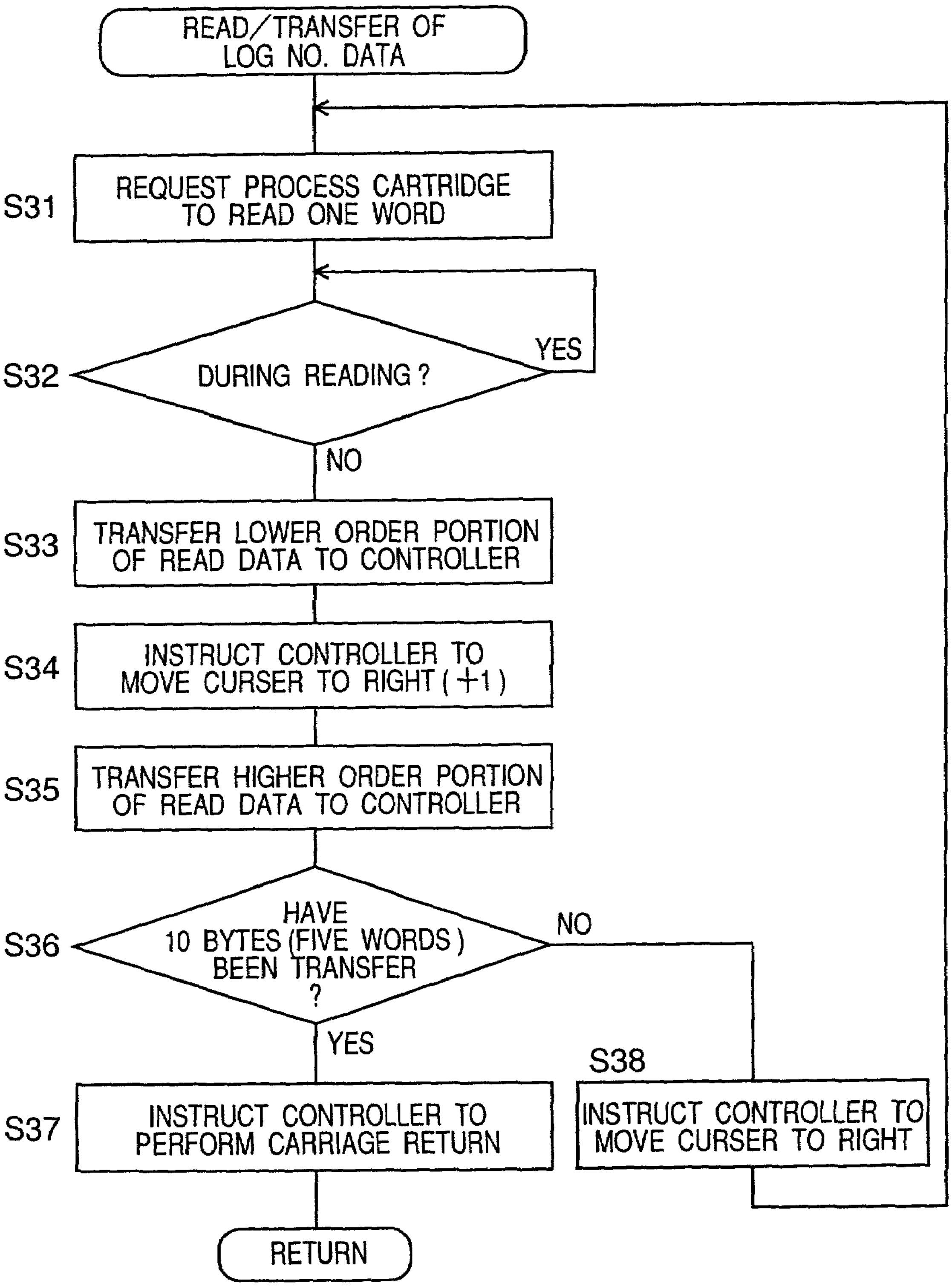
FIG. 16 shows a flow of lot number data read/transfer processing for reading "lot No." data from each process cartridge and transferring the data to a controller.
Figure 17A:
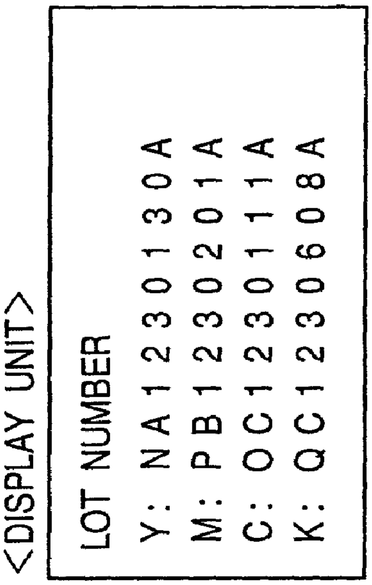
FIGS. 17A, 17B and 17C show correspondence between displayed lot numbers on a screen, how to control a cursor and stored "lot No." data in the EEPROM.
Figure 17B:
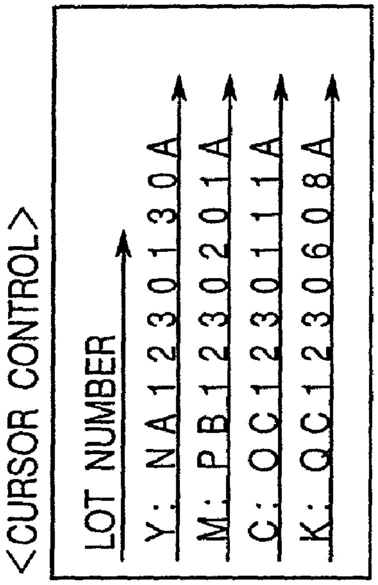
Figure 17C:
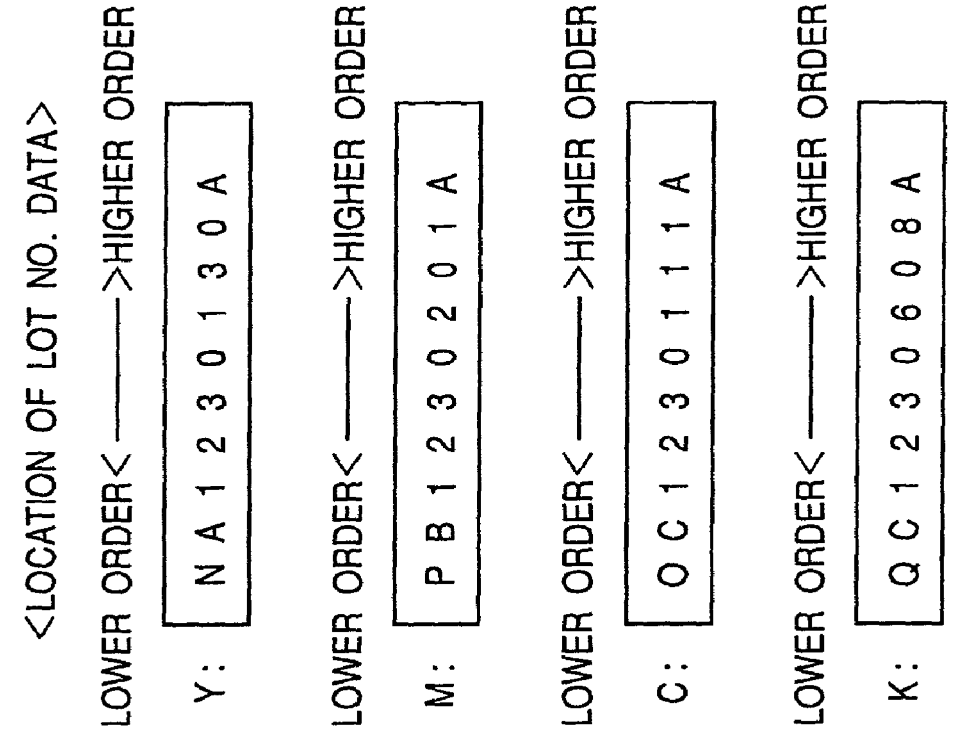

For example, as shown in FIG. 17C, character strings "NA1230130A", "PB1230201A", "OC1230111A" and "QC1230608A" constituting the lot numbers of the process cartridges 9Y, 9M, 9C, 9K, respectively, are stored in ASCII in the EEPROM 20. In this case, the controller 25 moves a cursor from a home position (left end) to the right as shown with an arrow along the first line in FIG. 17B in response to a notice from the CPU 27 that the lot number display mode is to be established (S22 in FIG. 15) to display character strings "lot number" as shown in the first line in FIG. 17A. Subsequently, as shown in FIG. 16, a one word read request is sent to the process cartridge 9Y for yellow (Y) (S31). If not during reading (S32), a lower-order portion of the read data (one byte) is transferred to the controller 25 (S33). Then, the controller 25 is instructed to move the cursor to the right (+1) (S34). Subsequently, a higher-order portion of the data (one byte) is transferred to the controller 25 (S35). Subsequently, if a transfer of 10 bytes (five words) of data is not completed, the controller 25 is instructed to move the cursor to the right (+1) (S38) and steps S31-S35 are repeated. Then, when the transfer of 10 bytes (five words) is finished (YES in S36), the carriage return (cursor return) is instructed to the controller 25 (S37). In this case, the cursor is moved towards the right as shown with an arrow along character strings "NA1230130A" on line 2 in FIG. 17B, the lot number of the process cartridge 9Y is displayed as "NA1230130A" as shown in the second line in FIG. 17A. The lot number of the process cartridge 9M for magenta (M), the lot number of process cartridge 9C for cyan (C) and the lot number of the process cartridge 9K for black (K) are also displayed in the third, fourth and fifth lines, respectively, in FIG. 17A with the same procedures. FIG. 13 shows schematically how data communication is performed between the main body of the printer 5 and each process cartridge 9 (9Y in this example) to read the "lot No." data.

Figure 18C:
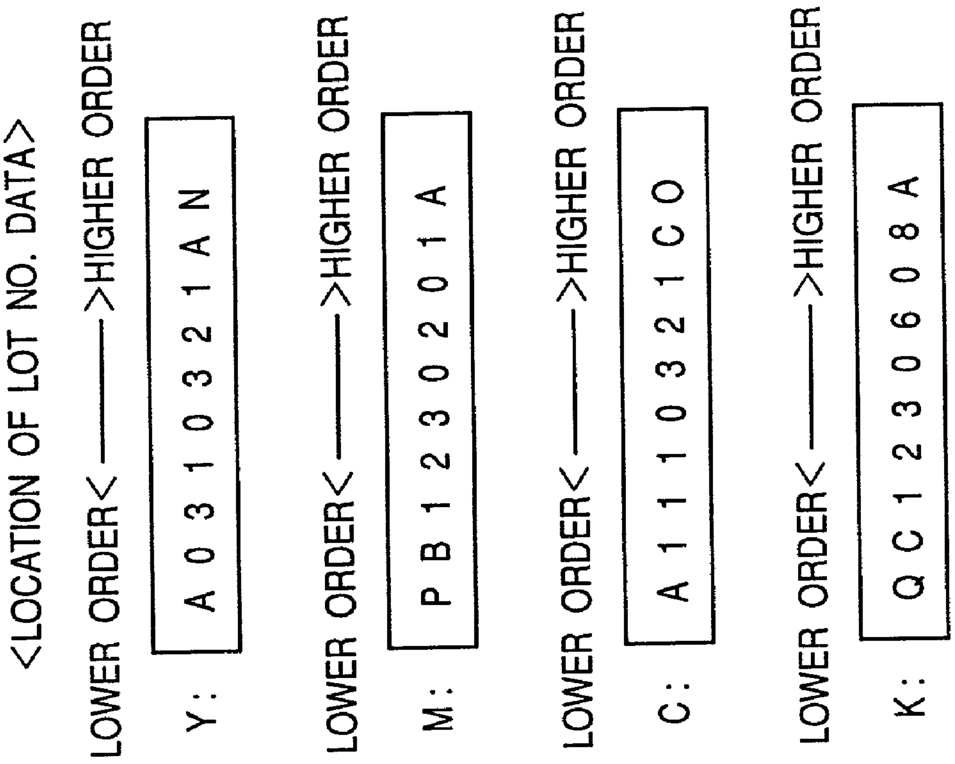
FIGS. 18A, 18B and 18C show correspondence between displayed lot numbers on a screen, how to control a cursor and stored "lot No." data in the EEPROM.
Figure 18A:
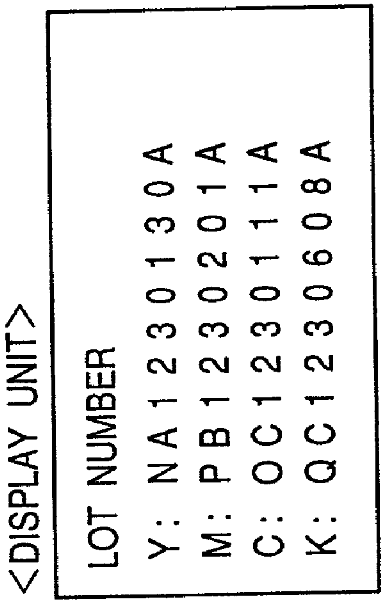
Figure 18B:
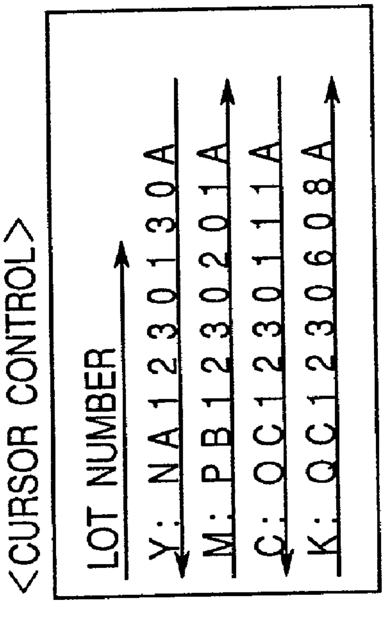
Figure 19A:
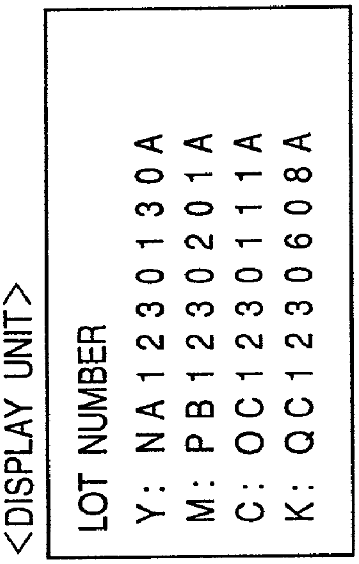
FIGS. 19A, 19B and 19C show correspondence between displayed lot numbers on a screen, how to control a cursor and stored "lot No." data in the EEPROM.
Figure 19B:
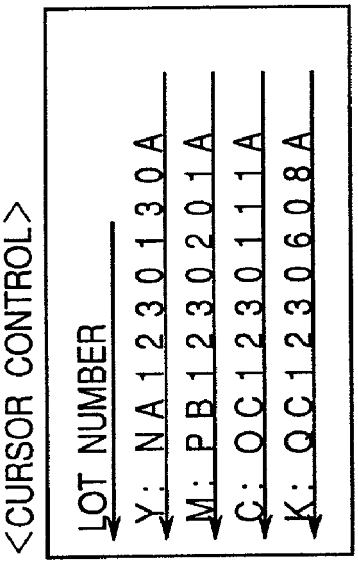
Figure 19C:
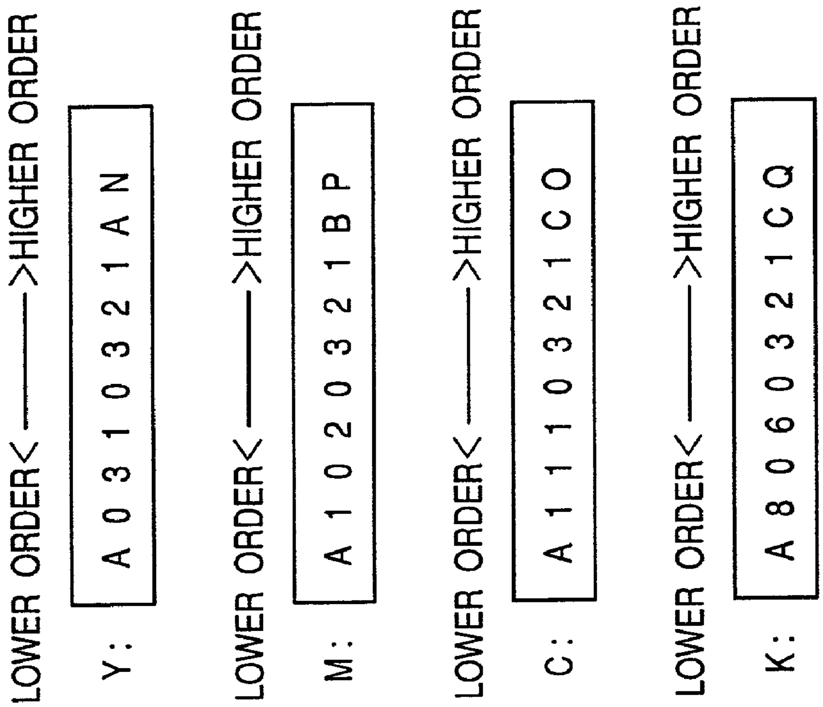

As shown with an arrow in FIG. 18B, when the cursor is alternately moved to the right and left, character strings constituting the lot numbers of the process cartridges 9Y, 9C corresponding to the even-numbered lines are stored as "A0310321AN" and "A1110321CO", which are inverse to the example in FIG. 17C, in the EEPROM 20 as shown in FIG. 18C. Also, as shown with an arrow in FIG. 19B, when the cursor is moved to the left in all the lines, as shown in FIG. 19C, character strings constituting the lot numbers of all the process cartridges 9Y, 9M, 9C, 9K are stored in an inverse direction to the example in FIG. 17C in the EEPROM 20. Thus, when the controller 25 of the main body of the printer 5 displays the lot number on the liquid crystal display device 501 while the "lot No." data is stored in the EEPROM 20 according to the order as displayed on the liquid crystal display device 501, communication processing between the EEPROM 20 of the process cartridge 9 and the controller 25 of the main body of the printer 5 becomes easy.

As shown in the memory map in FIG. 8, the EEPROM 20 has unused addresses of which use by the CPU 27 and the controller 25 of the main body of the printer 5 is not defined (addresses indicated as "undefined" in a data name column). The unused addresses include first unused addresses 15-20, at which prescribed values are stored, and second unused addresses 27-39, 42-47, 52-58, at which no data is stored in a shipment stage.

In a lot of the process cartridge 9 at an initial stage after release, the median 128 of the parameter ranges 0-255 (displayed as 0080h) is stored in the first unused addresses 15-20 in the shipment stage. Therefore, if a design change or the like is required after release of the process cartridge 9, the designer can change values stored in the first unused addresses 15-20 according to the design change or the like. In this case, when a plurality of versions of the process cartridge 9 exist in the market, the CPU 27 and the controller 25 of the main body of the printer 5 can control data according to the version of each process cartridge 9 by using the values stored at the first unused addresses 15-20 as initial values of the data item (parameter) related to the design change or the like.

This is described more specifically below with reference to adjustment of the ATDC sensor 300 attached to the developing device 103 of each process cartridge 9Y, 9M, 9C, 9K.

As shown in FIG. 20, the ATDC sensor 300 is composed of a light source control circuit 301, a light source 302 irradiating a developer 310 with light 309, a light receiving unit 303 receiving the light reflected from the developer 310 and a received light quantity detection circuit 304. The light source control circuit 301 adjusts a light quantity of the light source 302 according to the control quantity received from the CPU 27. The light 309 irradiating from the light source 302 through the detection window 305 to the developer 310 is reflected depending on the toner concentration in the developer 310 and made incident through the detection window 305 on the light receiving unit 303. The light 309 made incident on the light receiving unit 303 is photoelectrically converted and outputted by the received light quantity detection circuit 304 as 0-5.0 V output voltage depending on the received light quantity. This output voltage of the ATDC sensor 300 is converted to a gradation value 0-255 by an A/D converter (not shown). As shown with an unbroken line in FIG. 21, since the output voltage of the ATDC sensor changes depending on the toner concentration, the toner concentration can be controlled based on the output voltage of the ATDC sensor during a printing operation. However, this characteristic is shifted depending on the light quantity of the light source 302 as shown with a broken line in the figure. Therefore, when the process cartridge 9 is a new article (the toner concentration in the shipment is set to be 5%), the light quantity of the light source 302 is set so that the output voltage of the ATDC sensor 300 becomes 2.5 V.

Here, for example, it is assumed that the color tone of the toner is changed from one lot of the process cartridge 9 after beginning to put the printer on the market in order to improve image performance. Since the reflectance of the developer 310 is changed when the color tone of the toner is changed, the output voltage of the ATDC sensor 300 corresponding to the toner concentration of 5% is not 2.5 V any longer. Then, a data area to be accessed by the CPU 27 in the EEPROM 20 is extended and a value stored at address 15 in the EEPROM 20 is defined as a parameter value indicating a color tone of the toner. The parameter value range is defined as 0-255 (256 gradation). As shown in FIG. 22, a reference value (unit: V) of the output voltage of the ATDC sensor 300 is changed depending on a parameter value stored at address 15 so as to respond to the change.

The reference value of 2.5 V for a process cartridge 9 of an older version, which is not subjected to a change in the color tone of the toner, corresponds to the median 128 of the parameter range 0-255 stored at address 15 in the EEPROM 20. Therefore, no severe malfunction occurs when the CPU 27 and the controller 25 of the main body of the printer 5 which responds to a change in the color tone of the toner control the printing operation centering on the value.

Figure 23:
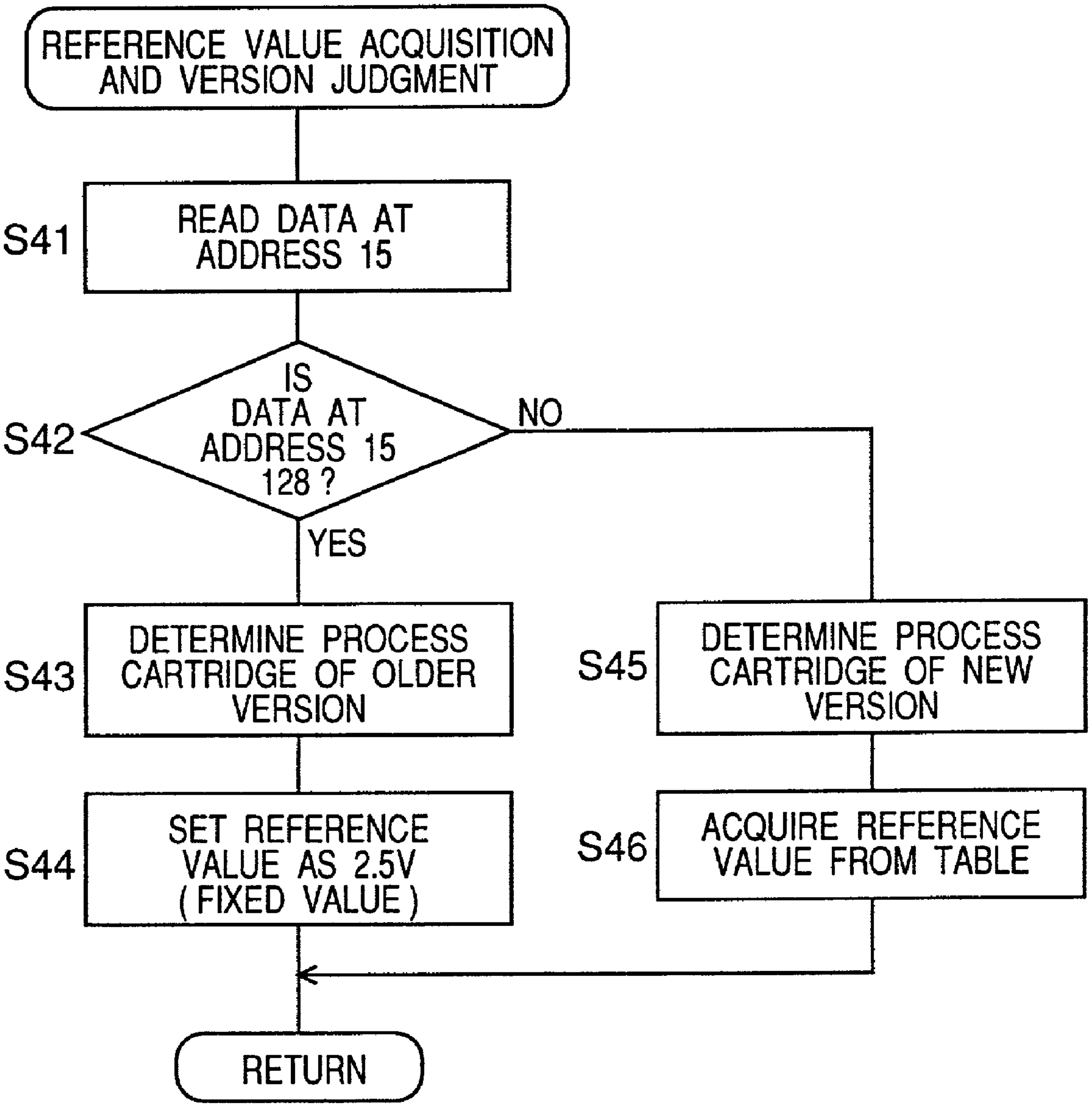
FIG. 23 shows a flow of reference value acquiring/version judging processing using a parameter value stored at address 15 in the EEPROM.

FIG. 23 shows a flow of reference value acquisition and version judgment processing executed by the CPU 27 when it is determined that the process cartridge 9 attached to the main body of the printer 5 is a new article. First, the CPU 27 reads a value stored at address 15 in the EEPROM 20 of the process cartridge 9 (S41) and judges whether the read value is 128 (S42). When the read value is 128, it is determined that the process cartridge 9 is of a version (older version), which is not subjected to a change in the color tone of the toner (S43). Then, the reference value of the output voltage of the ATDC sensor 300 is set to be 2.5 V (S44). On the other hand, when the value read from the address 15 in the EEPROM 20 is not 128, it is determined that the process cartridge 9 is of a version (new version), which is subjected to a change in the color tone of the toner (S45). Then, a table shown in FIG. 22 is referenced and a reference value depending on the read value is acquired (S46). When these are performed, the version of the process cartridge 9 can be obtained without providing an address exclusively indicating the version of the process cartridge in the EEPROM 20 of the process cartridge 9. As a result, the use efficiency of the memory can be increased as compared with when such an exclusively used address is provided.

Figure 24:
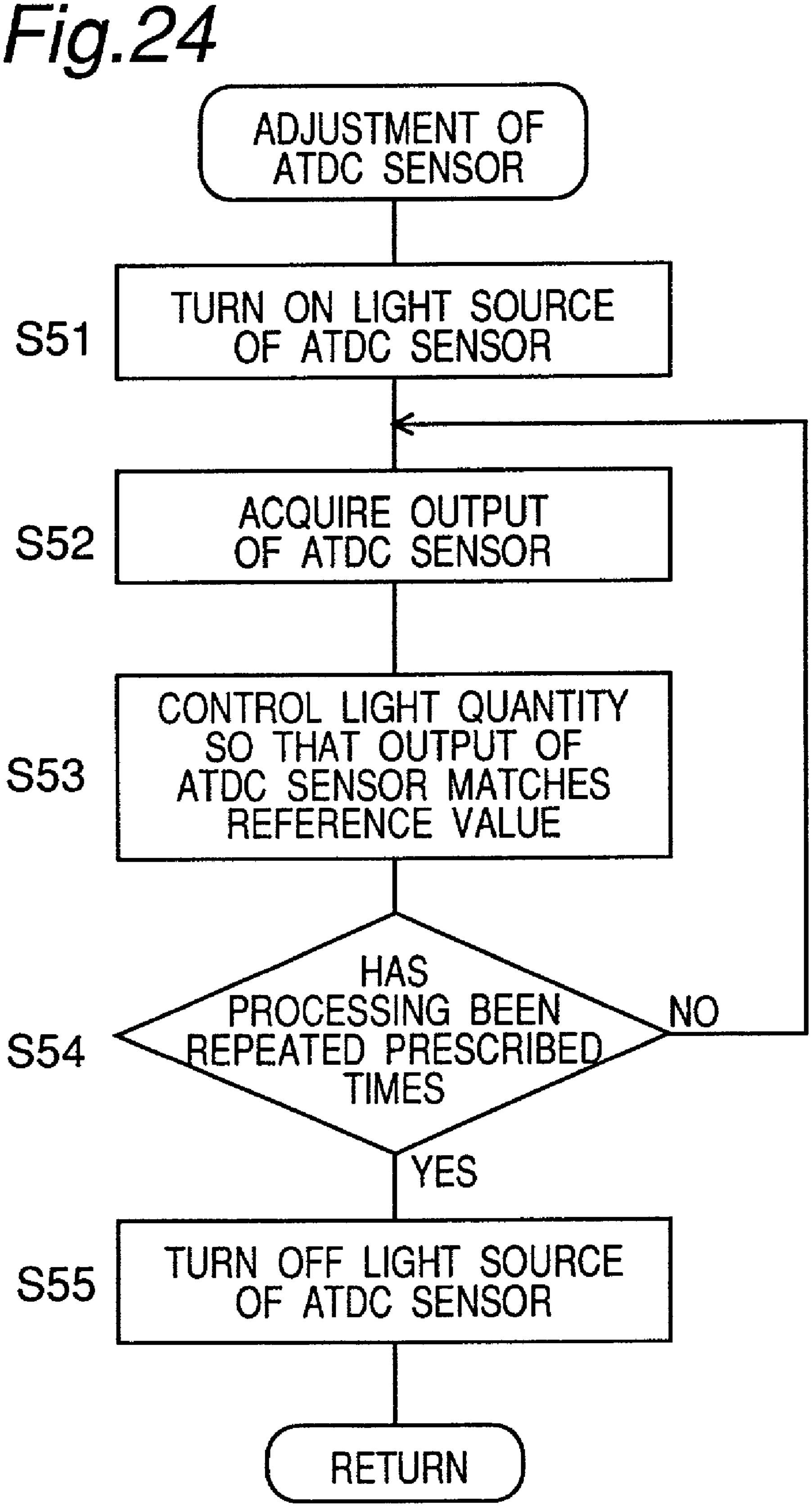
FIG. 24 shows a flow of ATDC sensor adjusting processing for adjusting an output voltage of the ATDC sensor based on the reference value.

FIG. 24 shows a flow of ATDC sensor adjustment processing, in which the CPU 27 adjusts the output voltage of the ATDC sensor based on the acquired reference value. First, the CPU 27 turns on the light source 302 of the ATDC sensor 300 (S51). Subsequently, the output voltage of the ATDC sensor 300 is acquired (S52). Then, the light quantity of the light source 302 is adjusted via the light source control circuit 301 so that the output voltage of the ATDC sensor 300 matches the reference value (S53). Then, the output voltage of the ATDC sensor 300 is acquired so that the output voltage of the ATDC sensor 300 is made sufficiently close to the reference value (S52) and adjustment of the light quantity of the light source 302 (S53) is repeated a prescribed number of times (S54). Then, the light source 302 of the ATDC sensor 300 is turned off (S55).

When these are performed, the process cartridges 9 of various versions can be used without changing a program of the main body of the printer 5 and that an appropriate printing operation can be performed even if a color tone change of the toner is repeated a plurality of number of times thereafter.

In the above example, a data area to be accessed by the CPU 27 in the EEPROM 20 is extended up to address 15, which is the lowest address in the first unused addresses 15-20, so as to indicate a change in the color tone of the toner. Thus, when more frequently used data is stored at a lower address, the CPU 27 and the controller 25 of the main body of the printer 5 can easily control a data item related to the design change or the like. This is because, when the CPU 27 of the main body of the printer 5 accesses data sequentially from the first address, all data stored in the EEPROM 20 can be read once before the second address for data having the same contents, which is stored at a plurality of addresses, is accessed without reading the same data twice. Therefore, as a reflective effect, the design change or the like itself can also become easy.

In this embodiment, a change in the color tone of the toner is exemplified as a design change after release of the process cartridge 9, but the design changes are not limited to this. It is apparent that the present invention can be widely applied to cases where other various design changes or the like are made. In such a case, the data area to be accessed by the CPU 27 in the EEPROM 20 has only to be sequentially extended from the first unused address 15 towards 20.

The reason why no data is stored in the second unused addresses 27-39, 42-47, 52-58 in the EEPROM 20 is that there is no possibility to extend the data area up to those addresses considering a future design change or the like. Thus, a decrease in work efficiency can be prevented by storing no data in addresses which have no possibility of being used in future.

In this embodiment, the process cartridge 9 has a photoreceptor drum 111, charger 101, exposing device 102, developing device 103, cleaner 116 and toner reservoir as components executing image formation in addition to the EEPROM 20 as a nonvolatile memory, but the process cartridge 9 is not limited to this. A process cartridge is encompassed in the scope of the present invention so long as the process cartridge has any of the above components for carrying out image formation. For example, the exposing device for exposing a surface of the photoreceptor drum may be fixed on the side of the main body of the printer. In this case, the process cartridge may be constituted as a unit by a photoreceptor unit including the photoreceptor drum, the charger and the cleaner and a developing unit including the developing device and the toner reservoir. The process cartridge can be easily manufactured by thus constituting the process cartridge as a unit.

A process cartridge having only the nonvolatile memory and the toner reservoir is also encompassed in the scope of the present invention. When a process cartridge of this aspect is used, the photoreceptor drum, charger, exposing device, developing device and cleaner, which are the remaining components, for example, may be fixed on the side of the main body of the printer or may constitute another process cartridge detachably attached to the main body of the printer.

In this embodiment, the process cartridge 9 incorporates the EEPROM 20 as a nonvolatile memory, but the constitution is not limited to this. The process cartridge of the present invention may have a nonvolatile memory other than the EEPROM. Furthermore, a nonvolatile memory does not need to be incorporated in the process cartridge, but may be attached to the outer surface of the process cartridge via a socket provided on the outer surface.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

What is claimed is:

1. A process cartridge detachably attached to a main body of an image forming device, the process cartridge comprising:

a component for carrying out image formation; and a nonvolatile memory for storing first destination information, comprising a shipment destination, to be used to control a printing operation by a control system of the main body of the image forming device, wherein the shipment destination is configured to identify a predetermined set of printing parameters stored in the control system, second destination information, comprising a destination code indicating a destination for production management, not to be used to control the printing operation by the control system of the main body of the image forming device, and process control information to be used to further control the printing operation by altering or replacing at least one of the predetermined printing parameters, wherein the shipment destination and the destination code are stored in separate areas of the nonvolatile memory located at nonconsecutive addresses.

2. The process cartridge according to claim 1, wherein the second destination information is stored at an address at which a lot number of the process cartridge is to be stored.

3. The process cartridge according to claim 1, wherein the second destination information is in a format to be displayed on a prescribed display unit by the control system of the main body of the image forming device.

4. The process cartridge according to claim 3, wherein the second destination information is stored in the nonvolatile memory in an order displayed on the display unit.

5. The process cartridge according to claim 1, wherein the second destination information constitutes part of a lot number of the process cartridge.

6. The process cartridge according to claim 5, wherein the lot number is stored in the nonvolatile memory in ASCII.

7. The process cartridge according to claim 5, wherein the lot number is stored in the nonvolatile memory by using ASCII and hexadecimal notation.

8. The process cartridge according to claim 1, wherein:

the first destination information comprises version information to be used to determine at least one reference value used in the printing operation, and to adjust the at least one reference value when the process cartridge is a different version than an original version.

9. The process cartridge according to claim 8, wherein the at least one reference value is a voltage value.

10. The process cartridge according to claim 1, wherein the image forming device comprises a photoreceptor drum, a charger, an exposing device, a developing device, a cleaner and a toner reservoir as components configured to execute image formation, and the process cartridge includes only the toner reservoir.

11. The process cartridge according to claim 1, wherein the process control information is stored in a first unused address of the nonvolatile memory, and comprises a printing parameter indicating a color tone of a toner.

12. The process cartridge of claim 1, wherein:

the shipment destination includes a destination selected from among multiple geographical districts, and the destination code includes a destination for production management such as sales district, sales form, or whether the product is a new article or recycled product.

13. A process cartridge detachably attached to a main body of an image forming device, the process cartridge comprising:

a component for carrying out image formation; and a nonvolatile memory for storing shipment destination data showing a shipment destination district of the process cartridge to be used to control a printing operation by a control system of the main body of the image forming device, wherein the shipment destination data is configured to indicate a predetermined set of printing parameters stored in the control system, a lot number, comprising a destination code indicating a destination for production management, of the process cartridge not to be used to control the printing operation by the control system of the main body of the image forming device, and process control information to be used to further control the printing operation by altering or replacing at least one of the predetermined printing parameters, wherein the shipment destination and the lot number are stored in separate areas of the nonvolatile memory located at nonconsecutive addresses.

14. The process cartridge according to claim 13, wherein the lot number shows that the process cartridge is a value pack.

15. The process cartridge according to claim 13, wherein the lot number shows that the process cartridge is a recycled product.

16. The process cartridge according to claim 13, wherein the nonvolatile memory also stores:

version information to be used to determine at least one reference value used in the printing operation, and to adjust the at least one reference value when the process cartridge is a different version than an original version.

17. The process cartridge according to claim 16, wherein the at least one reference value is a voltage value.

18. The process cartridge according to claim 13, wherein the image forming device comprises a photoreceptor drum, a charger, an exposing device, a developing device, a cleaner and a toner reservoir as components configured to execute image formation, and the process cartridge includes only the toner reservoir.

19. The process cartridge according to claim 13, wherein the process control information is stored in a first unused address of the nonvolatile memory, and comprises a printing parameter indicating a color tone of a toner.

20. The process cartridge of claim 13, wherein:

the shipment destination data includes a destination selected from among multiple geographical districts, and the lot number includes a destination for production management such as sales district, sales form or whether the product is a new article or recycled product.

* * * * *